United States Patent
Chang et al.

(10) Patent No.: US 7,233,468 B2
(45) Date of Patent: Jun. 19, 2007

(54) LEVEL SHIFTER ESD PROTECTION CIRCUIT WITH POWER-ON-SEQUENCE CONSIDERATION

(75) Inventors: Chyh-Yih Chang, Taipei County (TW); Kuo-Ching Chen, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 122 days.

(21) Appl. No.: 11/162,652

(22) Filed: Sep. 19, 2005

(65) Prior Publication Data

US 2007/0014061 A1  Jan. 18, 2007

(30) Foreign Application Priority Data

Jul. 15, 2005  (TW) .............. 94124040 A

(51) Int. Cl.
*H02H 9/00* (2006.01)
(52) U.S. Cl. ...................................................... 361/56
(58) Field of Classification Search ................ 361/56; 257/357
See application file for complete search history.

(56) References Cited

U.S. PATENT DOCUMENTS

| | | | |
|---|---|---|---|
| 5,625,280 A | 4/1997 | Voldman | 323/284 |
| 5,892,371 A | 4/1999 | Maley | 326/81 |
| 5,959,490 A | 9/1999 | Candage et al. | 327/333 |
| 6,075,686 A | 6/2000 | Ker | 361/56 |
| 6,157,530 A | 12/2000 | Pequignot et al. | 361/111 |
| 6,271,705 B1 | 8/2001 | Suh et al. | 327/310 |
| 6,320,413 B1 | 11/2001 | Kurisu | 326/73 |
| 6,385,021 B1 * | 5/2002 | Takeda et al. | 361/56 |
| 6,437,407 B1 | 8/2002 | Ker et al. | 257/357 |
| 6,608,744 B1 * | 8/2003 | Kato | 361/111 |
| 6,803,632 B2 * | 10/2004 | Kato | 257/357 |
| 7,151,400 B2 * | 12/2006 | Chen | 327/333 |
| 2005/0286187 A1 * | 12/2005 | Liu et al. | 361/56 |

* cited by examiner

*Primary Examiner*—Stephen W. Jackson
*Assistant Examiner*—Boris Benenson
(74) *Attorney, Agent, or Firm*—Jianq Chyun IP Office

(57) ABSTRACT

A level shifter ESD protection circuit with power-on-sequence consideration used for receiving a first signal and outputting a second signal is provided. The level shifter circuit includes an inverter, a first switch, a second switch, a voltage level shifting circuit, a first ESD clamp and a second ESD clamp circuits. When the first power supply has been powered on and the second power supply is off, the first and second switches will remain off resulting from the power-off of the second power supply. Therefore, the second power source would not be affected by the first power supply because of passing through the ESD protection circuit.

27 Claims, 15 Drawing Sheets

LEVEL SHIFTER ESD PROTECTION CIRCUIT WITH POWER-ON-SEQUENCE CONSIDERATION

CROSS-REFERENCE TO RELATED APPLICATION

This application claims the priority benefit of Taiwan application serial no. 94124040, filed on Jul. 15, 2005. All disclosure of the Taiwan application is incorporated herein by reference.

BACKGROUND OF THE INVENTION

1. Field of Invention

The present invention relates to an electrostatic discharge (ESD) protection circuit. More specifically, the present invention relates to a level shifter ESD protection circuit with power-on-sequence consideration.

2. Description of Related Art

In mixed-voltage IC, as shown in FIG. 1A, different internal circuits are supplied with power by the system voltage with different voltage levels, respectively. FIG. 1A is a block diagram of a portion of the circuit of a general mixed-voltage IC. In FIG. 1A, the operation power of the internal circuit 110 is provided by system voltage VDD1 (for example, 3.3 volts) and ground voltage VSS1 (for example, 0 volt). In addition, the operation power of the internal circuit 130 is provided by system voltage VDD2 (for example, 12 volts) and ground voltage VSS2 (for example, 0 volt). Since the input/output logic levels of the internal circuit 110 and the internal circuit 130 are different, a level shifter is needed to serve as the interface circuit of the internal circuit 110 and the internal circuit 130. For example, the level shifter 120 receives the output signal 111 (for example, 0~3.3 volts) output by the internal circuit 110, transforms the same into a corresponding signal 131 (for example, 0~12 volts) and outputs the same to the internal circuit 130.

When electrostatic discharge (ESD) happens at the connecting end of the mixed-voltage IC, the instantaneous ESD current would flows along the low impedance path in IC in a large volume. The large volume ESD current would generate high temperature and damage any components in the path of the current. FIG. 1B is a schematic diagram of the level shifter 120 and the ESD path in FIG. 1A. For example, as shown in FIG. 1B, when ESD event happens at the connecting end of the ground voltage VSS2, if the system voltage VDD1 is grounded, then the ESD current passes through the gate capacitor of the transistor 121 from the ground voltage line VSS2, flows to the system voltage line VDD1 (the dotted line ESD1 of the current path shown in the figure). Or, if the system voltage VSS1 is grounded, then the ESD current passes through the gate capacitor of the transistor 121 from the ground voltage line VSS2 and travels to the ground voltage line VSS1 (the dotted line ESD2 of the current path shown in the figure). As a result, the transistor 121 may be damaged (in the same principle, the transistor 122 may also be damaged).

The main cause of the damage of the above components is because there is no connection between the ground voltage line VSS1 and the ground voltage line VSS2. Therefore, the electrostatic discharge current ESD is not able to be conducted to the ground voltage line VSS2 via the ground voltage line VSS1, but only through the silicon substrate. If the substrate impedance is not small enough, the electrostatic discharge current ESD may damage the transistor 121. Since the ESD is instantaneous, therefore in the case of electrostatic discharge, the impedance of gate capacitor is less than the impedance of normal operation.

FIG. 1C is a schematic diagram of another level shifter 120 and ESD path in FIG. 1A. As shown in FIG. 1C, the gravity of regular ESD occurred in the system voltage line VDD2 is severer than the regular ESD occurred in the ground voltage line VSS2. That is because the ground voltage line VSS2 still has the substrate as the connection path connecting the ground voltage line VSS1, yet there is no discharging path in N well to help balance charge. Therefore, for example, when ESD event happens at the connecting end of the system voltage line VDD2, if system voltage VDD1 is grounded, then the electrostatic discharge current ESD travels through the gate capacitor of the transistor 123 from the system voltage line VDD2 and arrives at the system voltage line VDD1 (the dotted line ESD1 of the current path shown in FIG. 1C). Or, if the ground voltage line VSS1 is grounded, then the electrostatic discharge current ESD travels through the gate capacitor of the transistor 123 from the system voltage line VDD2 and arrives at the ground voltage line VSS1 (the dotted line ESD2 of the current path shown in FIG. 1C). As a result, the transistor 123 may be damaged (same principle, the transistor 124 may also be burned).

An ESD protection circuit (such as Taiwan Patent No. I234266) may be disposed in the level shifter 120 by those who are skilled in the art to avoid the level shifter 120 from damaged by ESD current. However, system voltage line VDD1 and system voltage line VDD2 are usually not powered on at the same time. For example, the mixed-voltage IC cuts off the power supply of the system voltage line VDD2 when entering power saving mode, while the power supply of the system voltage line VDD1 is maintained. If the power-on-sequence is taken into consideration, because of the disposition of the ESD protection circuit, the first powered-on power supply may affect the power which is not yet powered on and the related circuits thereof. For example, FIG. 1D schematically describes that, through the disposed ESD protection circuit, the power supply which has not been powered on and the related circuits are affected by the power supply which has been powered on earlier.

With reference to FIG. 1D, when the power supply of the system voltage line VDD1 is activated first before the power supply of the system voltage line VDD2, the system voltage line VDD1 supplies power to the system voltage line VDD2 via the transistor 125 and the ESD clamp circuit 126 (and/or the ESD clamp circuit 127). Therefore, the internal circuit 130 which should be turned off may be turned on because of the power supplied by the system voltage line VDD1. In addition, since the operating voltage of the internal circuit 130 is different from the voltage of the internal circuit 110, when the system voltage line VDD1 supplies power to the system voltage line VDD2 via the ESD clamp circuit, error of the internal circuit 130 will occur, and even the internal circuit 130 may be damaged.

SUMMARY OF THE INVENTION

The object of the present invention is to provide a level shifter ESD protection circuit with the power-on-sequence consideration to avoid the possible damage to the level shifter when the ESD current flows to another power supply connecting point from the connecting point of one power supply group of a plurality of power supply groups. In addition, the problem that the power which has not been started yet is affected by the power which has been started earlier passing through ESD clamp circuit due to different power-on-sequence can be avoided.

Another object of the present invention is to provide a level shifter ESD protection circuit with another power-on-sequence consideration; another ESD path is used to protect the level shifter from being damaged, and the problem that the power supply which is not yet started being affected by the power which has started earlier via the ESD clamp circuit can be avoided.

Another object of the present invention is to provide another level shifter ESD protection circuit with the power-on-sequence consideration; another ESD path is further used to connect different power supply groups so as to avoid the level shifter being damaged by the ESD current, and to avoid the power supply which is not yet started being affected by the power supply which has been started earlier via the ESD clamp circuit.

Base on the above and other objects, the present invention provides a level shifter ESD protection circuit with consideration of power-on-sequence to receive a first signal and to output a second signal with a corresponding level according to the level of the first signal. Wherein, the first signal operates between the first system voltage and the first ground voltage, and the second signal operates between the second system voltage and the second ground voltage. The level shifter ESD protection circuit includes an inverter, a first switch, a second switch, a voltage level shifting circuit, a first ESD clamp circuit and a second ESD clamp circuit. The inverter receives the first signal and outputs the first inverted signal, wherein the first inverted signal is the inverse of the first signal, and the first inverted signal operates between the first system voltage and the first ground voltage. The first end of the first switch is connected to the output end of the inverter and receives the first inverted signal. The first end of the second switch receives the first signal. The first switch and the second switch respectively determine the connection status of their first end and second end according to the level of the second system voltage. The first input end of the voltage level shifting circuit is connected to the second end of the first switch, and the second input end of the voltage level shifting circuit is connected to the second end of the second switch; the output end of the voltage level shifting circuit outputs the second signal. The first connecting ends of the first and the second ESD clamp circuits are both connected to the second system voltage, and the second connecting ends of the first and the second ESD clamp circuits are respectively connected to the first input end and the second input end of the voltage level shifting circuit.

From another point of view, the present invention provides a level shifter ESD protection circuit with the consideration of power-on-sequence. This level shifter ESD protection circuit includes the inverter, the first switch, the second switch, the voltage level shifting circuit, the first ESD clamp circuit and the second ESD clamp circuit. The inverter receives the first signal and outputs the first inverted signal. The first end of the first switch is connected to the output end of the inverter to receive the first inverted signal. The first end of the second switch receives the first signal. The first switch and the second switch respectively determine the connection status of their first end and second end according to the level of the second system voltage. The first input end and the second input end of the voltage level shifting circuit are respectively connected to the second end of the first switch and the second switch, and the output end of the voltage level shifting circuit outputs the second signal. The first connecting ends of the first and the second ESD clamp circuits are respectively connected to the first and the second input end of the voltage level shifting circuit, and the second connecting ends of the first and the second ESD clamp circuits are both connected to the second ground voltage.

The present invention further provides another level shifter ESD protection circuit with the power-on-sequence consideration, which includes the inverter, the first switch, the second switch, the voltage level shifting circuit and the ESD clamp circuit. The inverter receives the first signal and outputs the first inverted signal. The first end of the first switch is connected to the output end of the inverter to receive the first inverted signal. The first end of the second switch receives the first signal. The first switch and the second switch respectively determine the connection status of their first end and second end of the first switch and the second switch according to the level of the second system voltage. The first input end and the second input end of the voltage level shifting circuit are respectively connected to the second end of the first switch and the second switch, and the output end of the voltage level shifting circuit outputs the second signal. The first connecting end of the ESD clamp circuit is connected to the second system voltage, and the second connecting end of the ESD clamp circuit is connected to the first ground voltage.

Since the present invention utilizes the ESD clamp circuit, therefore the current path can be provided to conduct the instantaneous large volume ESD current between different power supply groups, and thus the damage to the internal circuit (especially the level shifter) in IC can be avoided. In addition, the switch-on/switch-off is controlled by the power-on/power-off, therefore, the problem that the power not yet started is affected by the power which has started earlier passing through the ESD clamp circuit due to different power-on-sequence can be avoided.

In order to the make the aforementioned and other objects, features and advantages of the present invention comprehensible, a preferred embodiment accompanied with figures is described in detail below.

DESCRIPTION OF EMBODIMENTS

Figure 1A:
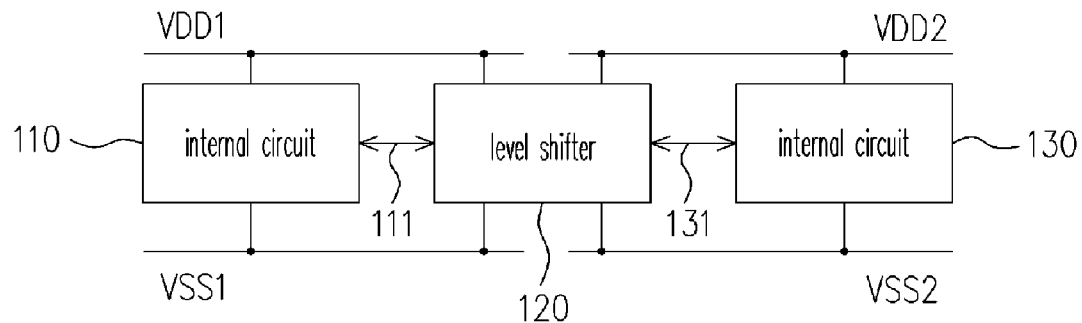
FIG. 1A is a block diagram of a portion of the circuit of a general mixed-voltage IC.
Figure 1B:
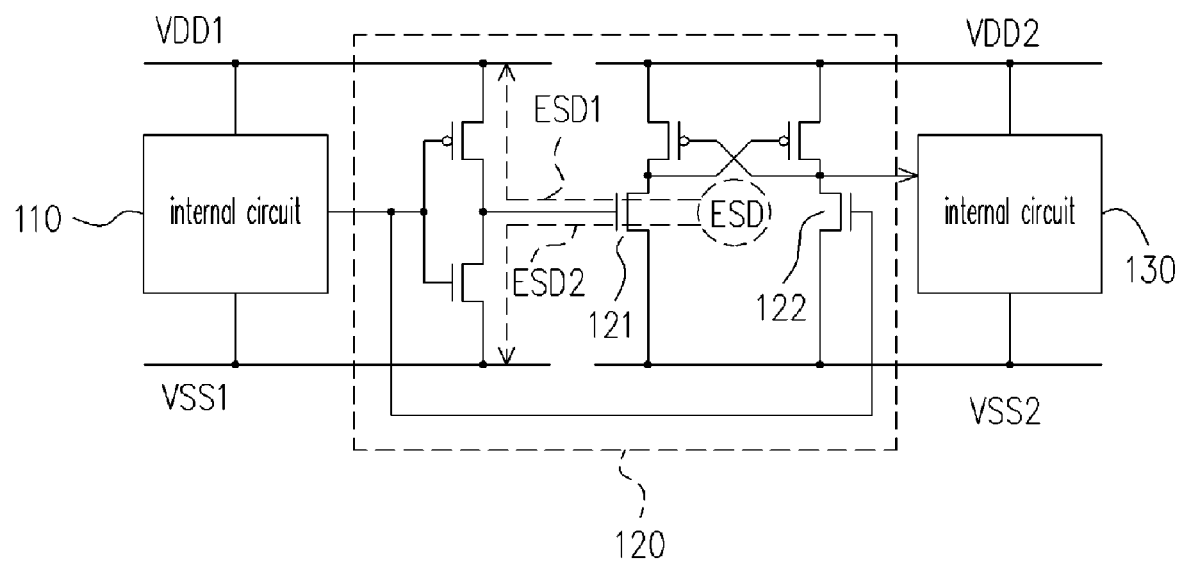
FIG. 1B is a schematic diagram of the level shifter and the ESD path in FIG. 1A.
Figure 1C:
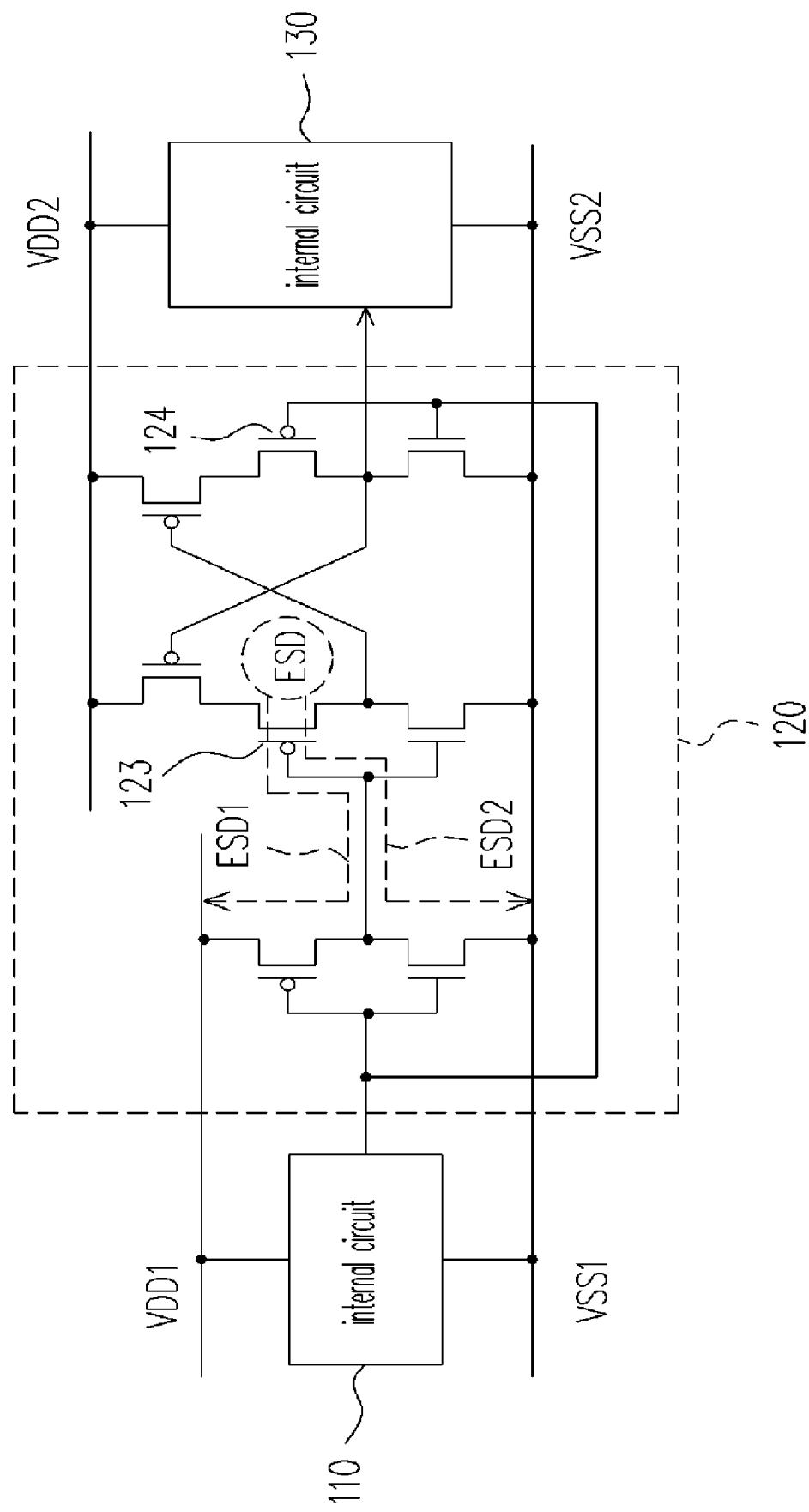
FIG. 1C is a schematic diagram of another level shifter and ESD path in FIG. 1A.
Figure 1D:
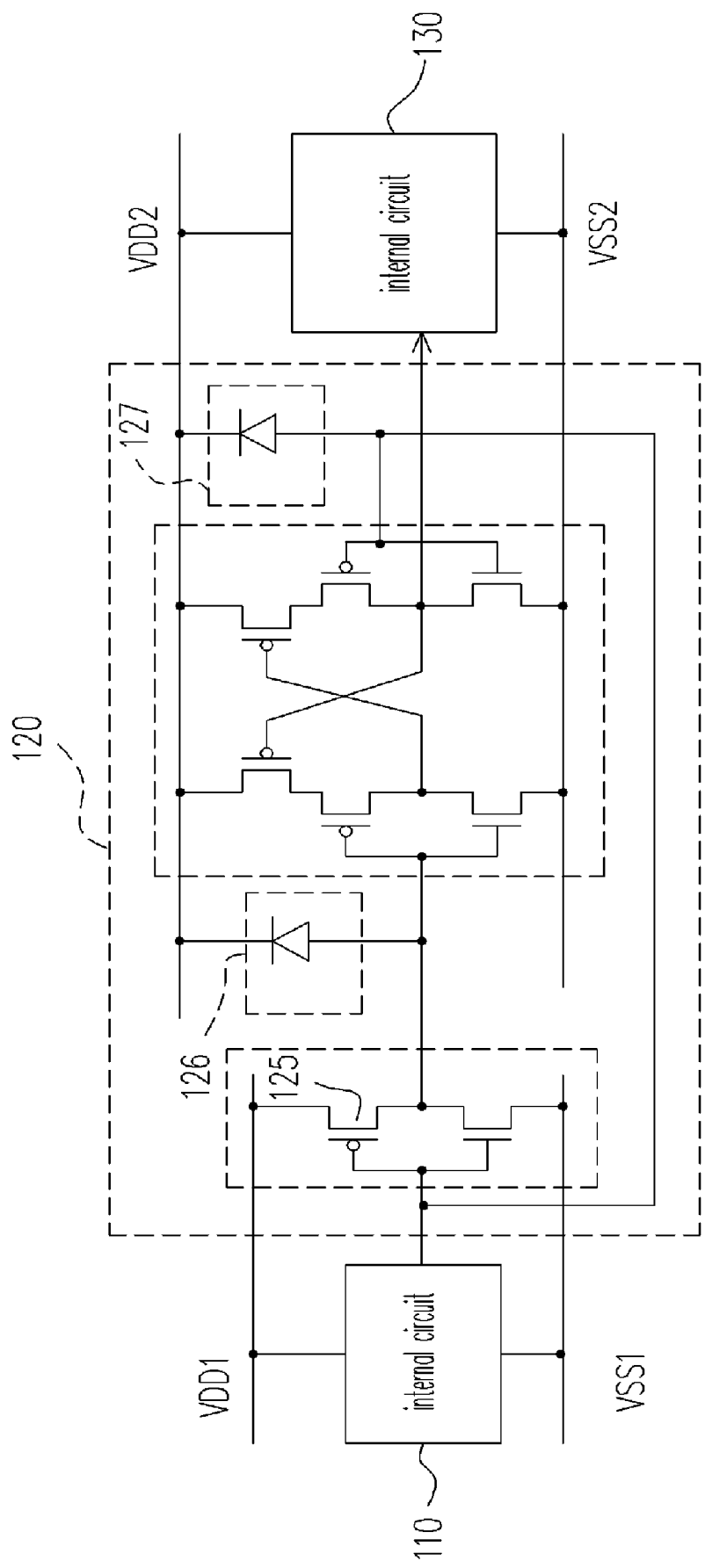
FIG. 1D schematically describes how the earlier powered-on power affects the power which has not been powered-on because of the disposition of the ESD protection circuit.
Figure 2A:
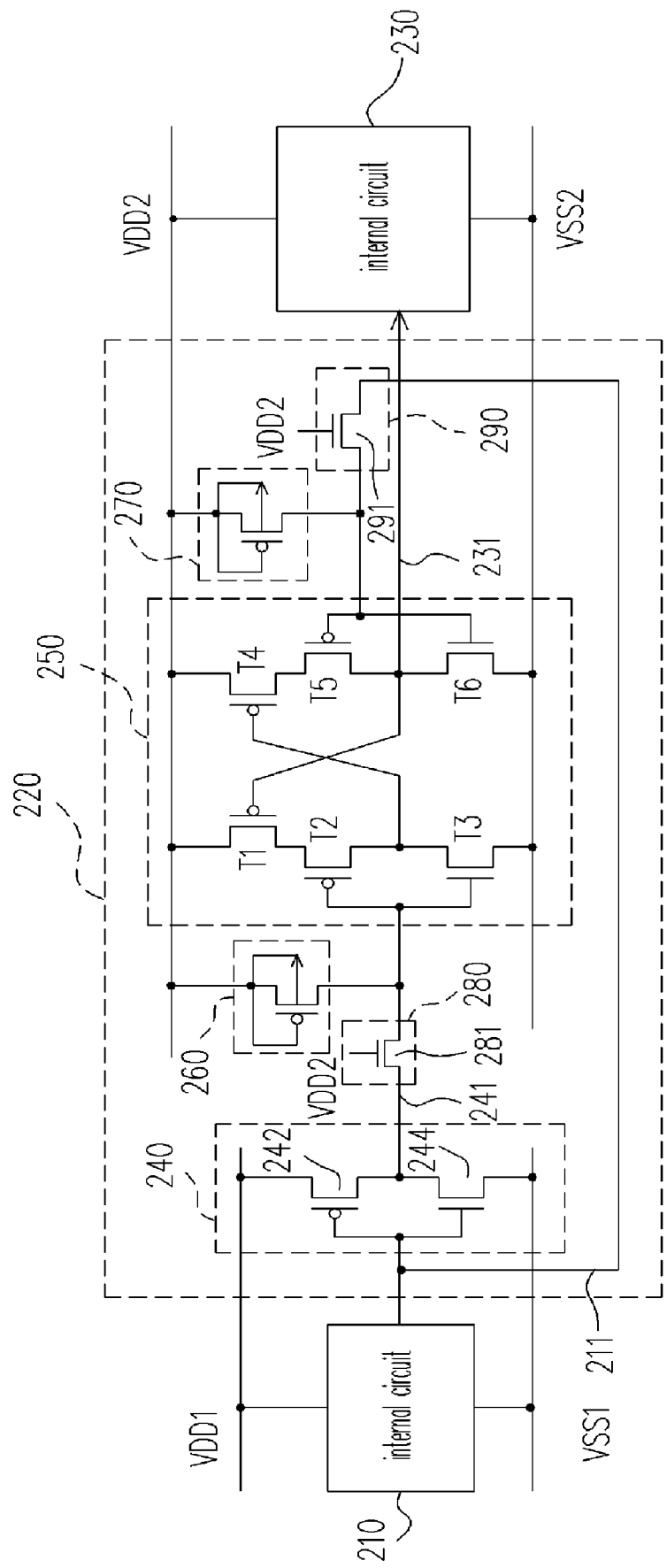
FIG. 2A schematically illustrates a circuit diagram of a level shifter ESD protection circuit according to an embodiment of the present invention.

FIG. 2A schematically illustrates a circuit diagram of a level shifter ESD protection circuit according to an embodiment of the present invention. With reference to FIG. 2A, the level shifter 220 receives the first signal 211 outputting from the internal circuit 210 in IC and outputs the second signal 231 (received by the internal circuit 230 in IC) with corresponding level according to the level of the first signal 211. Wherein, the first signal 211 operates between the first system voltage VDD1 (herein, for example, 3.3 volts) and the first ground voltage VSS1 (herein, for example, 0 volt). And the second signal 231 operates between the second system voltage VDD2 (herein, for example, 12 volts) and the second ground voltage VSS2 (herein, for example, 0 volt).

In the present embodiment, the level shifter 220 includes the inverter 240, the voltage level shifting circuit 250, the first ESD clamp circuit 260, the second ESD clamp circuit 270, the first switch 280 and the second switch 290. The inverter 240 receives the first signal 211 and outputs the first inverted signal 241. Wherein, the first inverted signal 241 is the inverse of the first signal 211; the first inverted signal 241 operates between the first system voltage VDD1 and the first ground voltage VSS1.

Here, the inverter 240, for example, includes a P transistor 242 and an N transistor 244. The source of the transistor 242 is connected to the first system voltage VDD1; the gate of the transistor 242 receives the first signal 211; and the drain of the transistor 242 outputs the first inverted signal 241. The gate of the transistor 244 receives the first signal 211; the drain of the transistor 244 is connected to the drain of the transistor 242; and the source of the transistor 244 is connected to the first ground voltage VSS1.

The first end of the first switch 280 is connected to the output end of the inverter 240 and receives the first inverted signal 241. The first end of the second switch 290 receives the first signal 211. The first switch 280 and the second switch 290 respectively determine the connection status between the first end and second end according to the level of the second system voltage VDD2. In other words, when the second system voltage VDD2 is powered on, both the first switch 280 and the second switch 290 are switched on; on the contrary, when the second system voltage VDD2 is off, both the first switch 280 and the second switch 290 are switched off.

In the present embodiment, the first switch 280 includes an N transistor 281. The gate of the transistor 281 is connected to the second system voltage VDD2, and its first connecting end and its second connecting end respectively are the first end and the second end of the first switch 280. The second switch 290 includes an N transistor 291. The gate of the transistor 291 is connected to the second system voltage VDD2, and its first connecting end and its second connecting end respectively are the first end and the second end of the second switch 290.

The first input end of the voltage level shifting circuit 250 is connected to the second end of the first switch 280, the second input end of the voltage level shifting circuit 250 is connected to the second end of the second switch 290, and the output end of the voltage level shifting circuit 250 outputs the second signal 231. The voltage level shifting circuit 250, for example, includes the P transistors T1, T2, T4, T5 and the N transistors T3 and T6. The first source/drain (hereinafter "the source") of the first transistor T1 is connected to the second system voltage VDD2. The gate of the second transistor T2 is the first input end of the voltage level shifting circuit 250. The first source/drain (hereinafter "the source") of the transistor T2 is connected to the second source/drain (hereinafter "the drain") of the transistor T1. The gate of the third transistor T3 is connected to the gate of the transistor T2. The first source/drain (hereinafter "the drain") of the transistor T3 is connected to the second source/drain (hereinafter "the drain") of the transistor T2. The second source/drain (hereinafter "the source") is connected to the second ground voltage VSS2. The first source/drain (hereinafter "the source") of the fourth transistor T4 is connected to the second system voltage VDD2, the gate of the transistor T4 is connected to the drain of the transistor T2. The gate of the fifth transistor T5 is the second input end of the voltage level shifting circuit 250. The first source/drain (hereinafter "the source") of the transistor T5 is connected to the second source/drain (hereinafter "the drain") of the transistor T4, while the second source/drain (hereinafter "the drain") of the transistor T5 is connected to the gate of the transistor T1. The gate of the transistor T6 is connected to the gate of the transistor T5. The first source/drain (hereinafter "the drain") of the transistor T6 is connected to the drain of the transistor T5. The second source/drain (hereinafter "the source") of the transistor T6 is connected to the second ground voltage VSS2. Wherein, the drain signal of the transistor T6 is the second signal 231.

The second connecting end of the first ESD clamp circuit 260 is connected to the first input end of the voltage level shifting circuit 250, while the first connecting end of the first ESD clamp circuit 260 is connected to the second system voltage VDD2. The second connecting end of the second ESD clamp circuit 270 is connected to the second input end of the voltage level shifting circuit 250, while the first connecting end of the second ESD clamp circuit 270 is connected to the second system voltage VDD2.

Figure 2B:
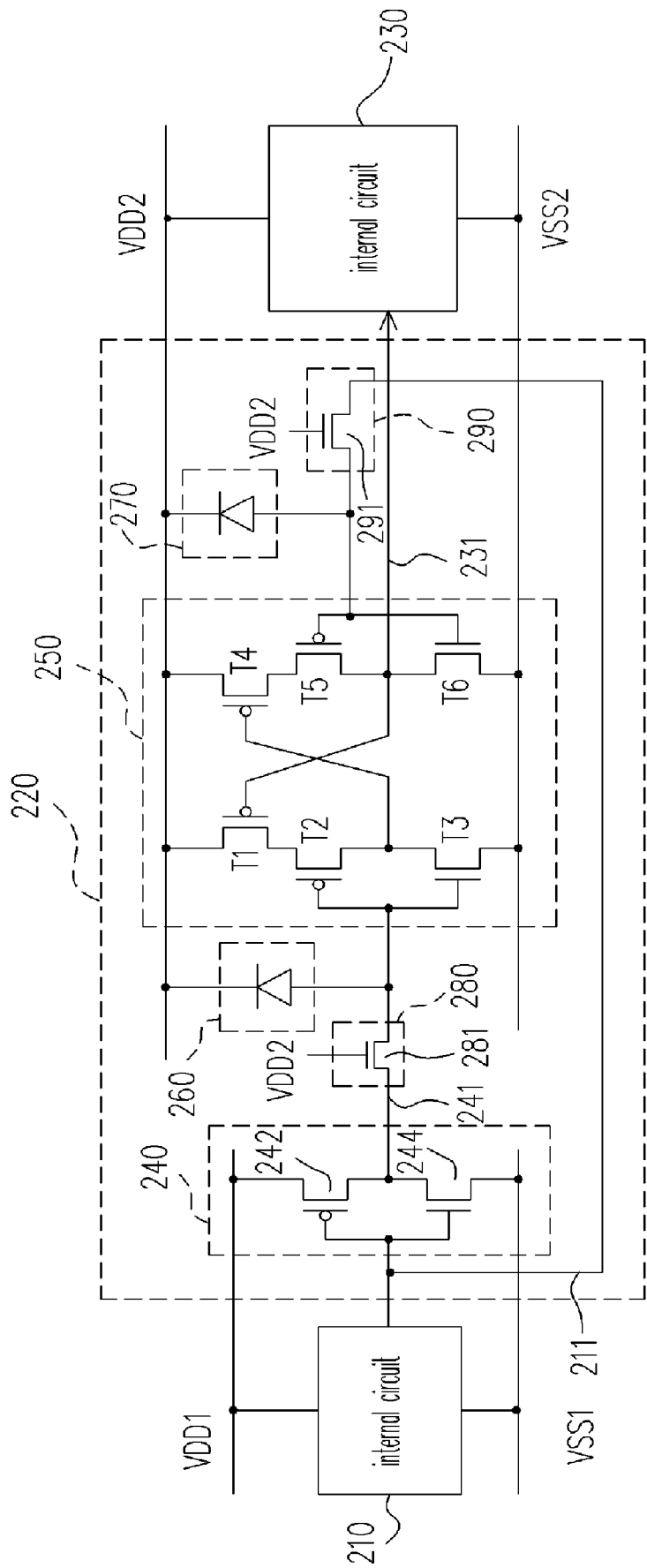
FIG. 2B schematically illustrates a circuit diagram of another level shifter ESD protection circuit according to the embodiment of the present invention.

In the present embodiment, the first ESD clamp circuit 260, for example, includes a P transistor. Wherein, the drain of the P transistor is connected to the first input end of the voltage level shifting circuit 250, while the gate, the source and the bulk of the P transistor are all connected to the second system voltage VDD2. Or, as known by those who are skilled in the art, the first ESD clamp circuit 260 can also be implemented using diode or other method, and its result is also within the scope of the present invention. FIG. 2B schematically illustrates a circuit diagram of another level shifter ESD protection circuit according to the embodiment of the present invention. With reference to FIG. 2B, if the first ESD clamp circuit 260 is implemented with diode, the anode of the diode is connected to the first input end of the voltage level shifting circuit 250, while the cathode of the diode is connected to the second system voltage VDD2. In the present embodiment, since the implementation of the second ESD clamp circuit 270 is similar to that of the first ESD clamp circuit 260, therefore the details are omitted.

Therefore, when the ESD event happens at the connecting end of the second system voltage line VDD2, if the system voltage VDD1 is grounded, the ESD current will flow to the system voltage line VDD1 from the system voltage line VDD2 via the first ESD clamp circuit 260 and the transistor 242. Or, if the ground voltage line VSS1 is grounded, the ESD current will flow to the ground voltage line VSS1 from the system voltage line VDD2 via the first ESD clamp circuit 260 and the transistor 244. Therefore, the damage to the level shifter 220 can be avoided. Moreover, the on/off of the control switches 280 and 290 are controlled based on the power-on/power-off of the second system voltage VDD2, therefore, the phenomenon that the second system voltage VDD2 which has not been powered on is affected by the first system voltage VDD1 which has been powered on earlier and passes through the ESD clamp circuit can be avoided.

Figure 3A:
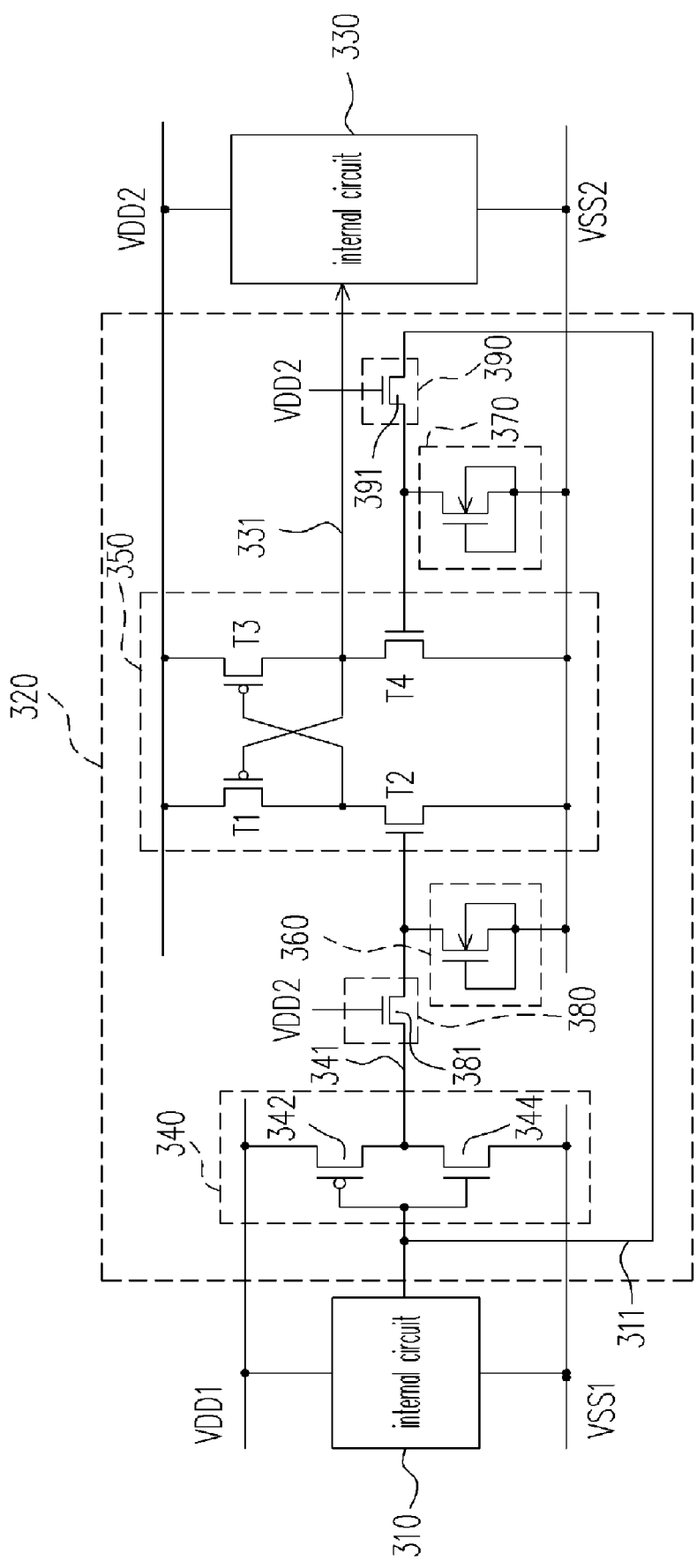
FIG. 3A schematically illustrates a circuit diagram of a level shifter ESD protection circuit according to another embodiment of the present invention.

An embodiment is provided to clearly describe the present invention. FIG. 3A schematically illustrates a circuit diagram of a level shifter ESD protection circuit according to another embodiment of the present invention. With reference to FIG. 3A, the level shifter 350 receives the first signal 311 output by the internal circuit 310 in IC and outputs the second signal 331 (received by the internal circuit 330 in IC) with the corresponding level according to the level of the first signal 311. Wherein, the first signal 311 operates between the first system voltage VDD1 (for example, 3.3 volts) and the first ground voltage VSS1 (for example, 0 volt). And the second signal 331 operates between the second system voltage VDD2 (for example, 12 volts) and the second ground voltage VSS2 (for example, 0 volt). The level shifter 320 includes an inverter 340, a voltage level shifting circuit 350, a first ESD clamp circuit 360, a second ESD clamp circuit 370, a first switch 380 and a second switch 390.

The inverter 340 receives the first signal 311 and outputs a first inverted signal 341. Wherein, the first inverted signal 341 is the inverse of the first signal 311, and the first inverted signal 341 operates between the first system voltage VDD1 and the first ground voltage VSS1. In the present embodiment, the inverter 340, for example, includes a P transistor 342 and an N transistor 344. The source of the transistor 342 is connected to the first system voltage line VDD1, the gate of the transistor 342 receives the first signal 311, and the drain of the transistor 342 outputs the first inverted signal 341. The gate of the transistor 344 receives the first signal 311, the drain of the transistor 344 is connected to the drain of the transistor 342, and the source of the transistor 344 is connected to the first ground voltage VSS1.

The first end of the first switch 380 is connected to the output end of the inverter 340 and receives the first inverted signal 341. The first end of the second switch 390 receives the first signal 311. The first switch 380 and the second switch 390 respectively determine the connection status between the first end and second end according to the level of the second system voltage VDD2. In other words, when the second system voltage VDD2 is powered on, both the first switch 380 and the second switch 390 are conducted; and contrariwise, when the second system voltage VDD2 is powered off, both the first switch 380 and the second switch 390 are cut off.

In the present invention, the first switch 380 includes an N transistor 381. The gate of the transistor 381 is connected to the second system voltage VDD2, the first connecting end and the second connecting end of the transistor 381 are respectively the first end and the second end of the first switch 380. The second switch 390 includes an N transistor 391. The gate of the transistor 391 is connected to the second system voltage VDD2, the first connecting end and the second connecting end of the transistor 391 are respectively the first end and the second end of the second switch 390.

The first input end of the voltage level shifting circuit 350 is connected to the second end of the first switch 380, the second input end of the voltage level shifting circuit 350 is connected to the second end of the second switch 390, and the output end of the voltage level shifting circuit 350 outputs the second signal 331. The second connecting end of the first ESD clamp circuit 360 is connected to the second ground voltage VSS2, the first connecting end of the first ESD clamp circuit 360 is connected to the first input end of the voltage level shifting circuit 350. The second connecting end of the second ESD clamp circuit 370 is connected to the second ground voltage VSS2, the first connecting end of the second ESD clamp circuit 370 is connected to the first input end of the voltage level shifting circuit 350.

In the present embodiment, the voltage level shifting circuit 350, for example, includes the P transistors T1, T3 and N transistors T2 and T4. The first source/drain (hereinafter "the source") of the first transistor T1 is connected to the second system voltage VDD2. The gate of the second transistor T2 is the first input end of the voltage level shifting circuit 350. The first source/drain (hereinafter "the drain") of the second transistor T2 is connected to the second source/drain (hereinafter "the drain") of the first transistor T1. The second source/drain (hereinafter "the source") of the transistor T2 is connected to the second ground voltage VSS2. The first source/drain (hereinafter "the source") of the third transistor T3 is connected to the second system voltage VDD2, and the second source/drain (hereinafter "the drain") of the transistor T3 is connected to the gate of the transistor T1, and the gate of the transistor T3 is connected to the drain of the transistor T1. The gate of the transistor T4 is the second input end of the voltage level shifting circuit 350. The first source/drain (hereinafter "the drain") of the transistor T4 is connected to the drain of the transistor T3, and the second source/drain (hereinafter "the source") of the transistor T4 is connected to the second ground voltage VSS2. Wherein, the drain signal of the transistor T4 is the second signal 331.

Figure 3B:
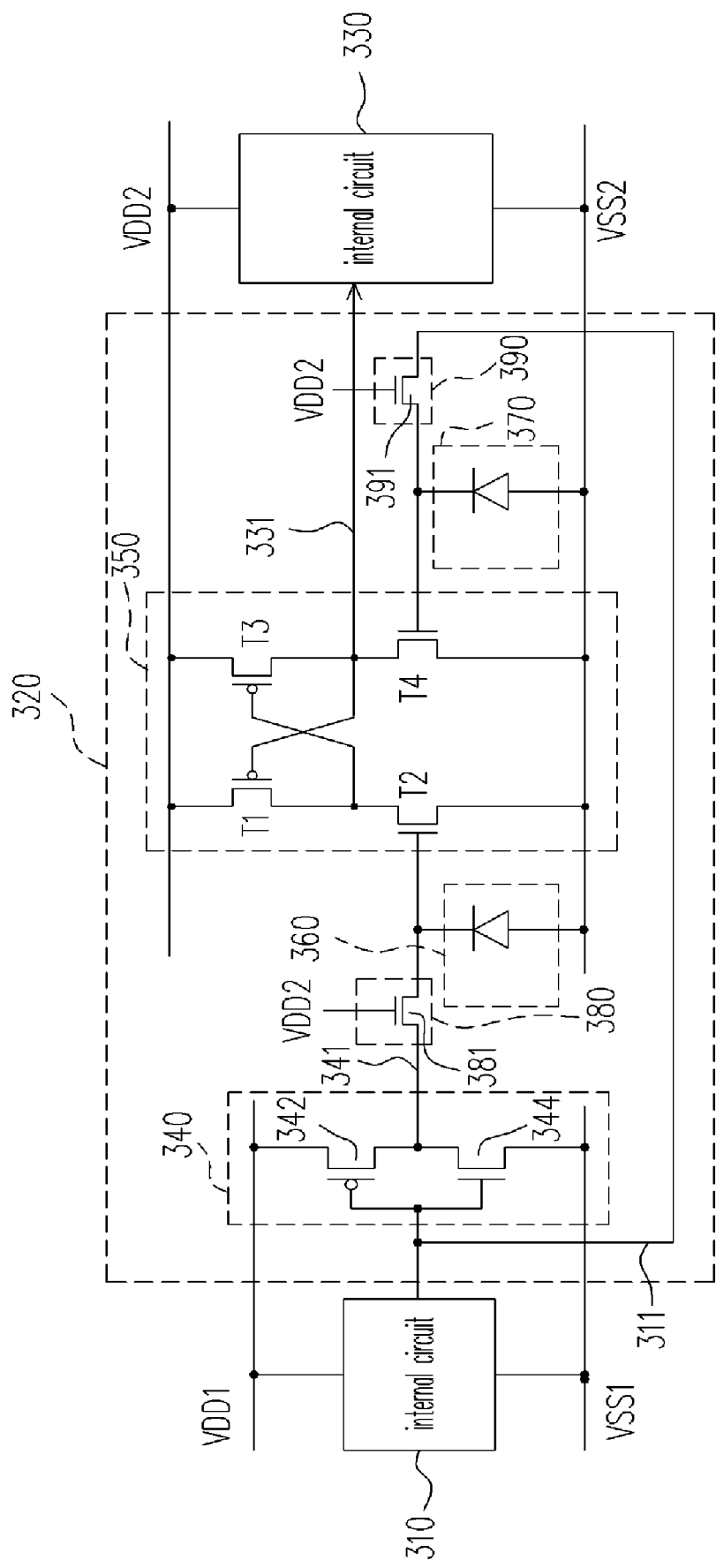
FIG. 3B schematically illustrates a circuit diagram of another level shifter ESD protection circuit according to another embodiment of the present invention.

In the present embodiment, the first ESD clamp circuit 360, for example, includes an N transistor. Wherein, the drain of the N transistor is connected to the first input end of the voltage level shifting circuit 350, and the gate, the source and the bulk of the N transistor are all connected to the second ground voltage VSS2. Or, as known by those who are skilled in the art, the first ESD clamp circuit 360 can also be implemented using diode or other method, and its result is also within the scope of the present invention. FIG. 3B schematically illustrates a circuit diagram of another level shifter ESD protection circuit according to another embodiment of the present invention. With reference to FIG. 3B, if the first ESD clamp circuit 360 is implemented with diode, the cathode of the diode is connected to the first input end of the voltage level shifting circuit 350, while the anode of the diode is connected to the second ground voltage VSS2. In the present embodiment, since the implementation of the second ESD clamp circuit 370 is similar to that of the first ESD clamp circuit 360, the details are omitted.

Therefore, when the ESD event happens at the connecting end of the ground voltage VSS2, if the system voltage VDD1 is grounded, the ESD current will flow to the system voltage line VDD1 from the ground voltage line VSS2 via the first ESD clamp circuit 360 and the transistor 342. Or, if the ground line VSS1 is grounded, the ESD current will flow to the ground voltage line VSS1 from the ground voltage line VSS2 via the first ESD clamp circuit 360 and the transistor 244. Moreover, the on/off of the control switches 380 and 390 are controlled based on the power-on/power-off of the second system voltage VDD2; therefore, the problem that the second system voltage VDD2 which has not been power-on is affected by the first system voltage VDD1 which has been power-on earlier and passes through the ESD clamp circuit can be avoided.

Figure 4A:
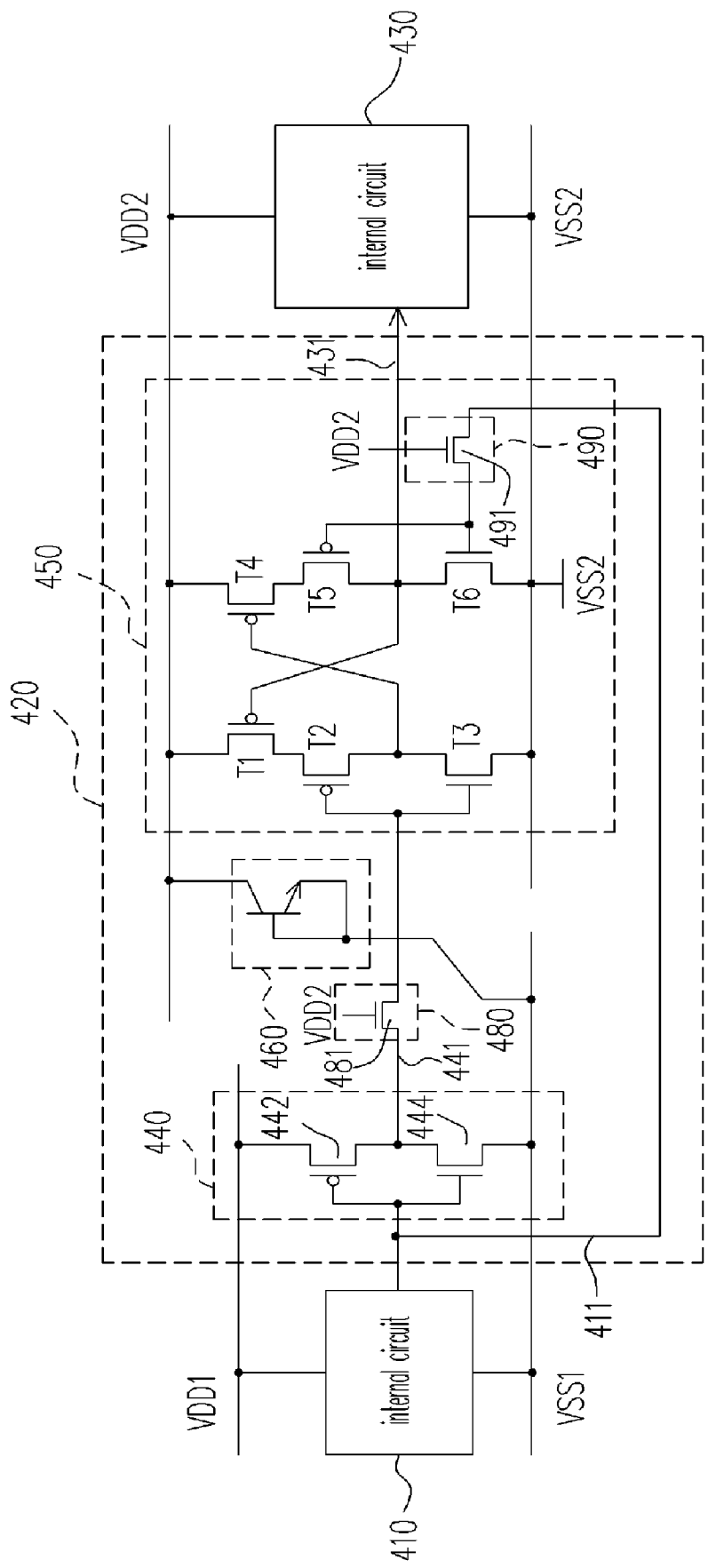
FIG. 4A schematically illustrates a circuit diagram of a level shifter ESD protection circuit according to another embodiment of the present invention.

To more clearly and specifically illustrate the present invention, another embodiment is further provided herein. FIG. 4A schematically illustrates a circuit diagram of a level shifter ESD protection circuit according to another embodiment of the present invention. With reference to FIG. 4A, the level shifter circuit 420 receives the first signal 411 output by the internal circuit 410 in IC and outputs the second signal 431 (received by the internal circuit 430 in IC) with the corresponding level according to the level of the first signal 411. Wherein the first signal 411 operates between the first system voltage VDD1 (for example, 3.3 volts) and the first ground voltage VSS1 (for example, 0 volt). And the second signal 431 operates between the second system voltage VDD2 (for example, 12 volts) and the second ground voltage VSS2 (for example, 0 volt).

In the present embodiment, the level shifter circuit 420, for example, includes an inverter 440, a voltage level shifting circuit 450, an ESD clamp circuit 460, a first switch 480 and a second switch 490. The inverter 440 receives the first signal 411 and outputs the first inverted signal 441. Wherein, the first inverted signal 441 is the inverse of the first signal 411, and the first inverted signal 441 operates between the first system voltage VDD1 and the first ground voltage VSS1.

The first end of the first switch 480 is connected to the output end of the inverter 440 and receives the first inverted signal 441. The first end of the second switch 490 receives the first signal 411. The first switch 480 and the second switch 490 respectively determine the connection status between the first end and second end according to the level of the second system voltage VDD2. In other words, when the second system voltage VDD2 is powered on, both the first switch 480 and the second switch 490 are conducted; and contrariwise, when the second system voltage VDD2 is powered off, both the first switch 480 and the second switch 490 are switched off.

In the present embodiment, the first switch 480 includes an N transistor 481. The gate of the transistor 481 is connected to the second system voltage VDD2, and its first connecting end and its second connecting end respectively are the first end and the second end of the first switch 480. The second switch 490 includes an N transistor 491. The gate of the transistor 491 is connected to the second system voltage VDD2, and its first connecting end and its second connecting end respectively are the first end and the second end of the second switch 490.

Herein, since the voltage level shifting circuit 450 and the inverter 440, for example, are the same as the voltage level shifting circuit 250 and the inverter 240 in FIG. 2A in the previous embodiment, therefore the description is omitted.

Figure 4B:
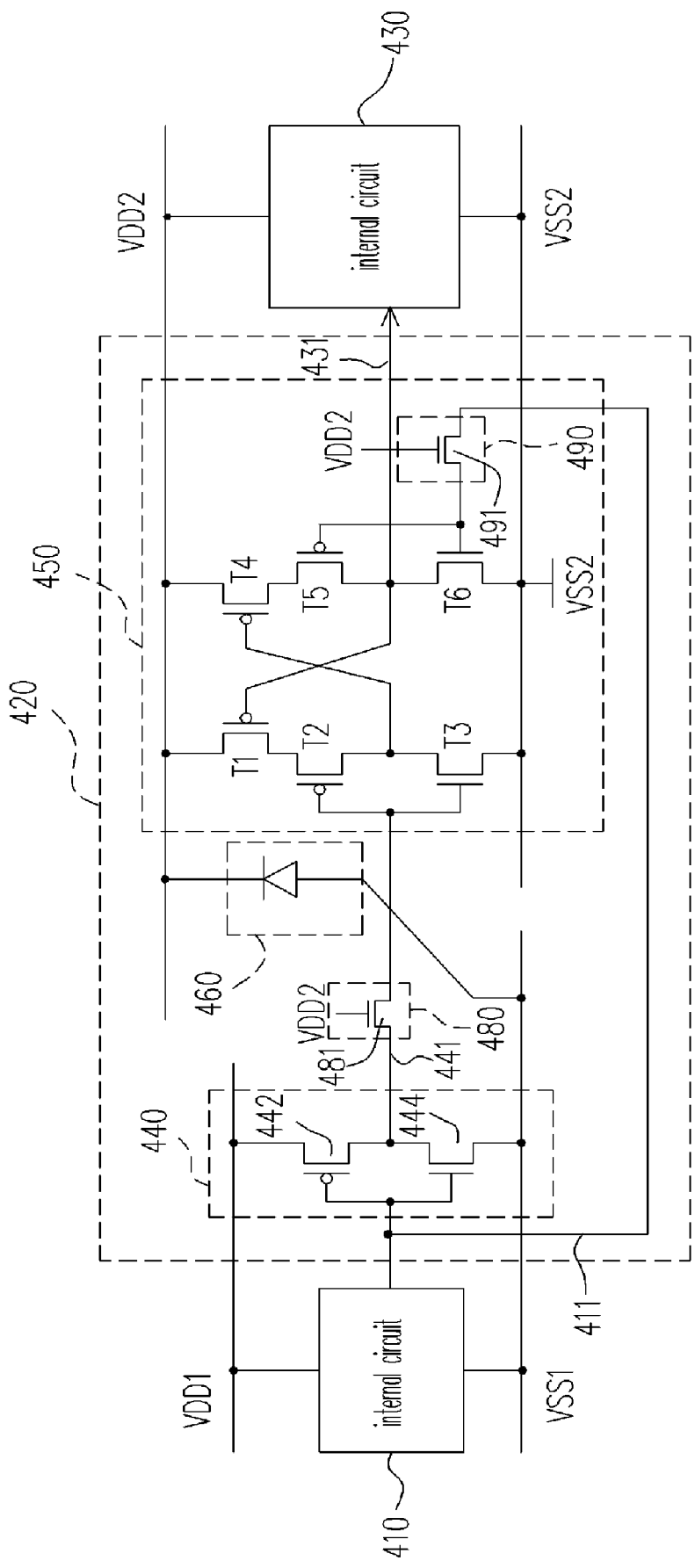
FIG. 4B schematically illustrates a circuit diagram of another level shifter ESD protection circuit according to another embodiment of the present invention.

The first connecting end of the first ESD clamp circuit 460 is connected to the second system voltage VDD2, the second connecting end of the first ESD clamp circuit 460 is connected to the first ground voltage VSS2. In the present embodiment, the ESD clamp circuit 460, for example, includes a transistor. Wherein, the collector of the transistor is connected to the second system voltage VDD2; the base and the emitter of the transistor are connected to the first ground voltage VSS1. Or, as known by those who are skilled in the art, the ESD clamp circuit 460 can also be implemented using diode or other method, and the result thereof is also within the scope of the present invention. FIG. 4B schematically illustrates a circuit diagram of another level shifter ESD protection circuit according to another embodiment of the present invention. With reference to FIG. 4B, if the ESD clamp circuit 460 is implemented with diode, the anode of the diode is connected to the first ground voltage VSS1, while the cathode of the diode is connected to the second system voltage VDD2.

Therefore, when the ESD event happens at the connecting end of the system voltage line VDD2, if the ground voltage line VSS1 is grounded, the ESD current will flow to the ground voltage line VSS1 from the system voltage VDD2 via the ESD clamp circuit 460. Therefore, the damage to the level shifter circuit 420 can be avoided. Moreover, the on/off of the control switches 480 and 490 is controlled based on the power-on/power-off of the second system voltage VDD2; thus, the phenomenon that the second system voltage VDD2 which is not power-on is affected by the first system voltage VDD1 which has been power-on earlier can be avoided.

Figure 5A:
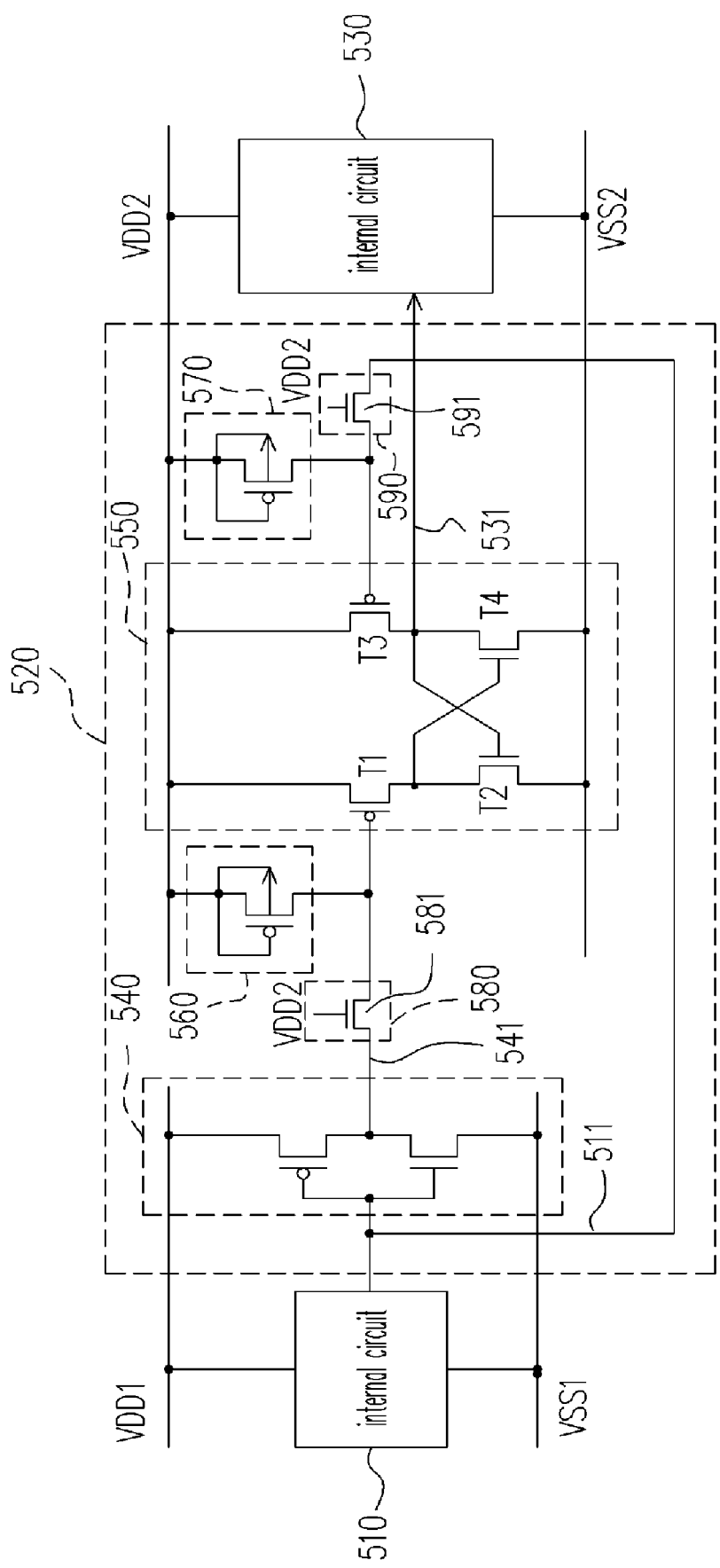
FIG. 5A schematically illustrates a circuit diagram of a level shifter ESD protection circuit according to another embodiment of the present invention.

FIG. 5A schematically illustrates a circuit diagram of a level shifter ESD protection circuit according to another embodiment of the present invention. With reference to FIG. 4B, the level shifter circuit 520 receives the first signal outputting from the internal circuit 510 in IC and outputs the second signal 531 (received by the internal circuit 530 in IC) with the corresponding level according to the level of the first signal 511. Wherein, the first signal 511 operates between the first system voltage VDD1 (for example, 12 volts) and the first ground voltage VSS1 (for example, 0 volt), and the second signal 531 operates between the second system voltage VDD2 (for example, 3.3 volts) and the second ground voltage VSS2 (for example, 0 volt).

In the present embodiment, the level shifter 520 includes the inverter 540, the voltage level shifting circuit 550, the ESD clamp circuit 560, the ESD clamp circuit 570, the first switch 580 and the second switch 590. The inverter 540 receives the first signal 511 and outputs the first inverted signal 541. Wherein, the first inverted signal 541 is the inverse of the first signal 511, and the first inverted signal 541 operates between the first system voltage VDD1 and the first ground voltage VSS1.

The first end of the first switch 580 is connected to the output end of the inverter 540 and receives the first inverted signal 541. The first end of the second switch 590 receives the first signal 511. The first switch 580 and the second switch 590 respectively determine the connection status between the first end and second end according to the level of the second system voltage VDD2. In other words, when the second system voltage VDD2 is powered on, both the first switch 580 and the second switch 590 are switched on; on the contrary, when the second system voltage VDD2 is powered off, both the first switch 280 and the second switch 290 are switched off.

In the present embodiment, the first switch 580 includes an N transistor 581. The gate of the transistor 581 is connected to the second system voltage VDD2, and its first connecting end and its second connecting end respectively are the first end and the second end of the first switch 580. The second switch 590 includes an N transistor 591. The gate of the transistor 591 is connected to the second system voltage VDD2, and its first connecting end and its second connecting end respectively are the first end and the second end of the second switch 590.

In the present embodiment, the voltage level shifting circuit 550, for example, includes the P transistors T1, T3, and N transistors T2 and T4. The first source/drain (hereinafter "the source") of the transistor T1 is connected to the second system voltage VDD2, the gate of the transistor T1 is the first input end of the voltage level shifting circuit 550. The first source/drain (hereinafter "the drain") of the transistor T2 is connected to the second source/drain (hereinafter "the drain") of the transistor T1. The second source/drain (hereinafter "the source") of the transistor T2 is connected to the second ground voltage VSS2. The first source/drain (hereinafter "the source") of the transistor T3 is connected to the second system voltage VDD2, and the second source/drain (hereinafter "the drain") of the transistor T3 is connected to the gate of the transistor T2, and the gate of the transistor T3 is the second input end of the voltage level shifting circuit 550. The gate of the transistor T4 is connected to the drain of the transistor T1, and the first source/drain (hereinafter "the drain") of the transistor T4 is connected to the drain of the transistor T3, and the second source/drain (hereinafter "the source") of the transistor T4 is connected to the second ground voltage VSS2. Wherein, the signal of the drain of the transistor T4 is the second signal 531.

Figure 5B:
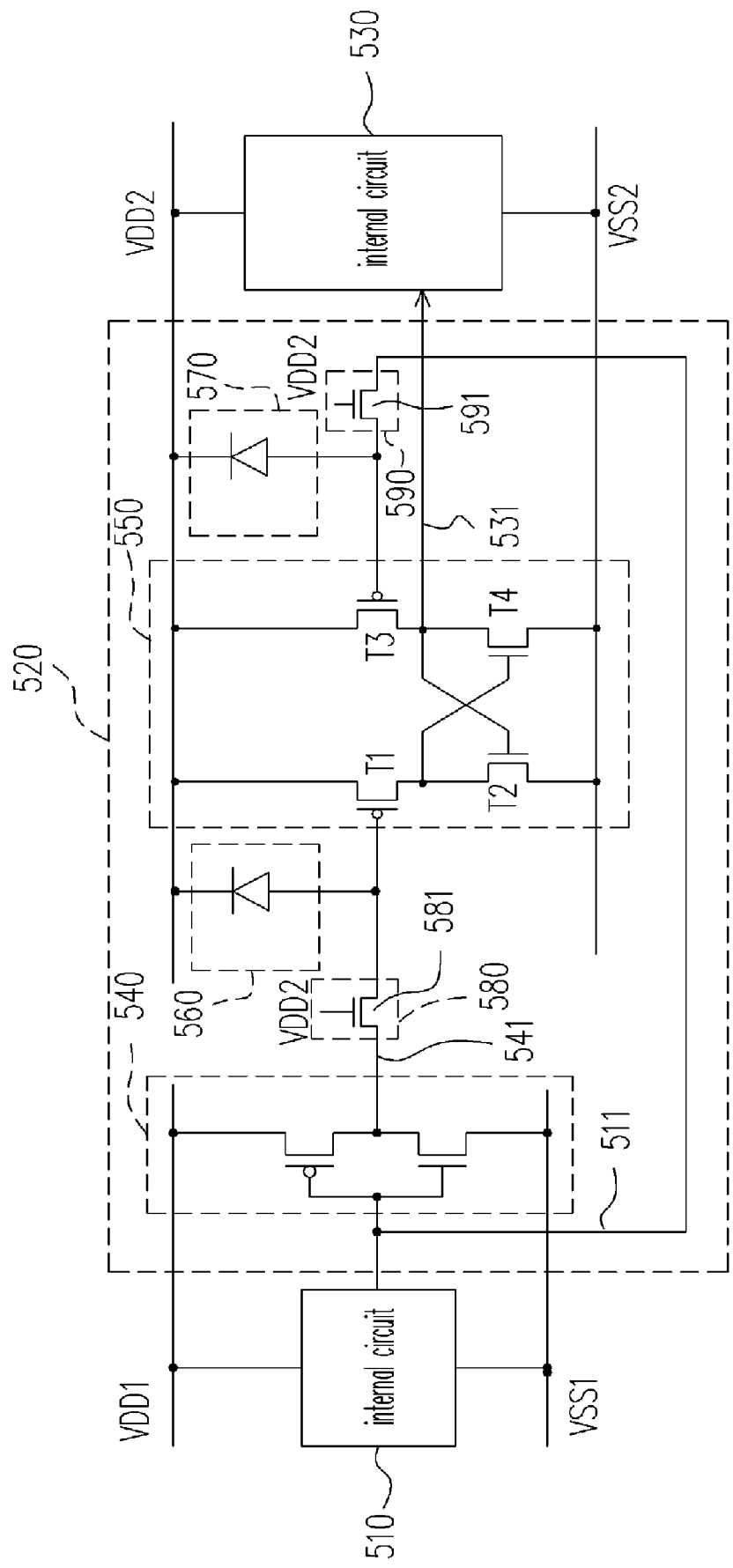
FIG. 5B schematically illustrates a circuit diagram of another level shifter ESD protection circuit according to the embodiment of the present invention.

The first connecting end of the ESD clamp circuit 560 is connected to the second system voltage VDD2, while the second connecting end of the ESD clamp circuit 560 is connected to the gate of the transistor T1. In the present embodiment, the ESD clamp circuit 560, for example, includes a P transistor. Wherein, the drain of the P transistor is connected to the first input end (the gate of the transistor T1) of the voltage level shifting circuit 550, and the gate, the source and the bulk of the P transistor are all connected to the second system voltage VDD2. Or, as known by those who are skilled in the art, the ESD clamp circuit 560 can also be implemented using diode or other method, and the result thereof is also within the scope of the present invention. FIG. 5B schematically illustrates a circuit diagram of another level shifter ESD protection circuit according to the embodiment of the present invention. With reference to FIG. 5B, if the ESD clamp circuit 560 is implemented with diode, the anode of the diode is connected to the first input end of the voltage level shifting circuit 550, while the cathode of the diode is connected to the second system voltage VDD2.

In the present embodiment, since the implementation of the second ESD clamp circuit 570 is similar to that of the first ESD clamp circuit 560, therefore it will not be described again.

Figure 6A:
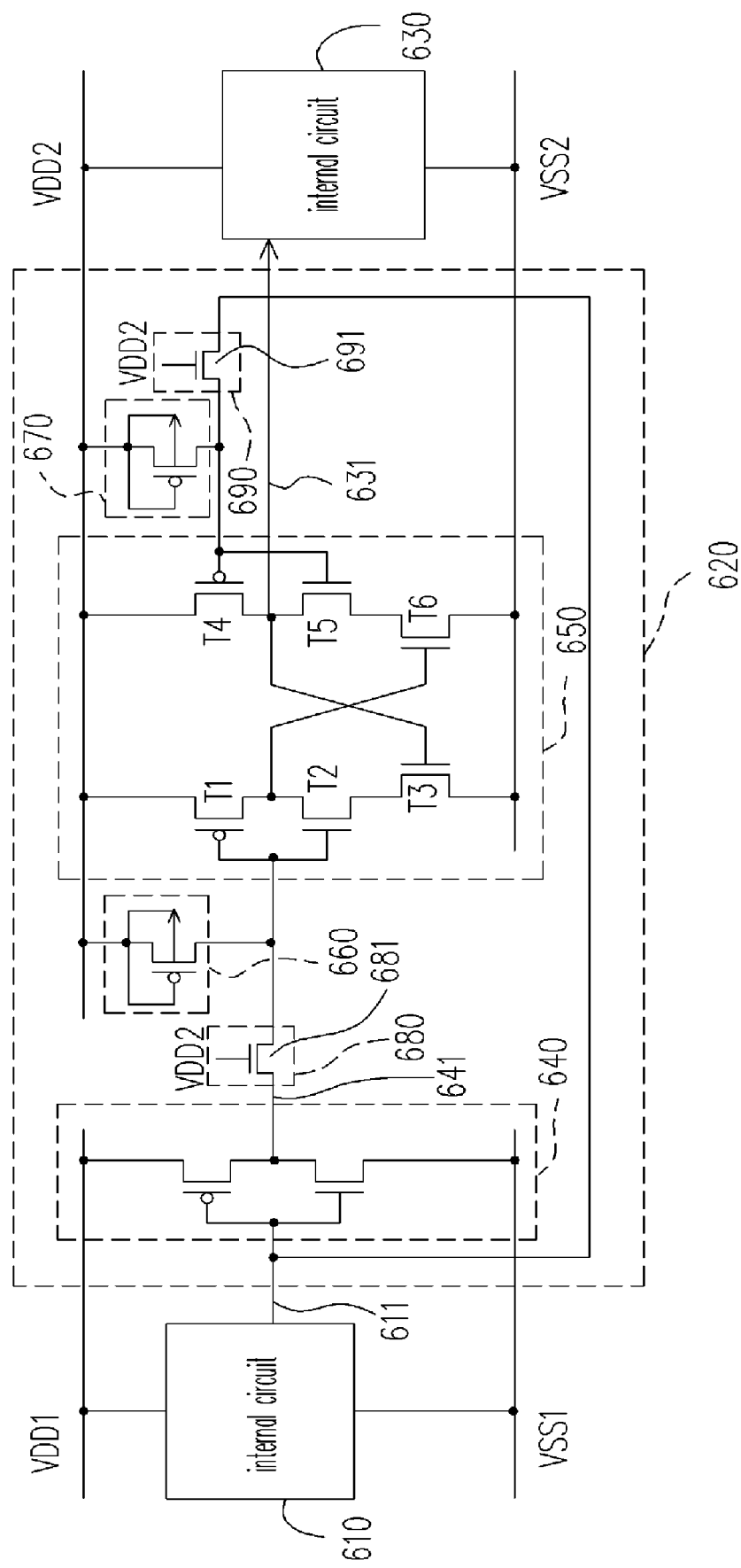
FIG. 6A schematically illustrates a circuit diagram of a level shifter ESD protection circuit according to another embodiment of the present invention.

FIG. 6A schematically illustrates a circuit diagram of a level shifter ESD protection circuit according to another embodiment of the present invention. With reference to FIG. 6A, the level shifter circuit 620 receives the first signal 611 output by the internal circuit 610 in IC and outputs the second signal 631 (received by the internal circuit 630 in IC) with the corresponding level according to the level of the first signal 611. Wherein, the first signal 611 operates between the first system voltage VDD1 (for example, 12 volts) and the first ground voltage VSS1 (for example, 0 volt). And the second signal 631 operates between the second system voltage VDD2 (for example, 3.3 volts) and the second ground voltage VSS2 (for example, 0 volt).

In the present embodiment, the level shifter 620 includes the inverter 640, the voltage level shifting circuit 650, the ESD clamp circuit 660, the ESD clamp circuit 670, the first switch 680 and the second switch 690. The inverter 640 receives the first signal 611 and outputs the first inverted signal 641. Wherein, the first inverted signal 641 is the inverse of the first signal 611, and the first inverted signal 641 operates between the first system voltage VDD1 and the first ground voltage VSS1. Herein, the inverter 640, for example, is respectively the same as the inverters of the previous embodiments, so it is not described.

The first end of first switch 680 is connected to the output end of the inverter 640 and receives the first inverted signal 641. The first end of the second switch 690 receives the first signal 611. The first switch 680 and the second switch 690 respectively determine the connection status between the first end and second end according to the level of the second system voltage VDD2. In other words, when the second system voltage VDD2 is powered on, both the first switch 680 and the second switch 690 both switched on; on the contrary, when the second system voltage VDD2 is powered off, both the first switch 680 and the second switch 690 are switched off.

In the present embodiment, the first switch 680 includes an N transistor 681. The gate of the transistor 681 is connected to the second system voltage VDD2, and its first connecting end and its second connecting end respectively are the first end and the second end of the first switch 680. The second switch 690 includes an N transistor 691. The gate of the transistor 691 is connected to the second system voltage VDD2, and its first connecting end and its second connecting end respectively are the first end and the second end of the second switch 690.

In the present embodiment, the voltage level shifting circuit 650, for example, includes the P transistors T1, T4 and the N transistors T2, T3, T5, T6. The gate of the transistor T1 is the first input end of the voltage level shifting circuit 650. The first source/drain (hereinafter "the source") of the first transistor T1 is connected to the second system voltage VDD2. The gate of the second transistor T2 is connected to the gate of the transistor T1. The first source/drain (hereinafter "the drain") of the transistor T2 is connected to the second source/drain (hereinafter "the drain") of the transistor T1. The first source/drain (hereinafter "the drain") of the transistor T3 is connected to the second source/drain (hereinafter "the source") of the transistor T2. The second source/drain (hereinafter "the source") is connected to the second ground voltage VSS2. The first source/drain (hereinafter "the source") of the transistor T4 is connected to the second system voltage VDD2, the second source/drain (hereinafter "the drain") of the transistor T4 is connected to the gate of the transistor T3. The gate of the transistor T4 is the second input end of the voltage level shifting circuit 650. The gate of the transistor T5 is connected to the gate of the transistor T4. The first source/drain (hereinafter "the drain") of the transistor T5 is connected to the drain of the transistor T4. The gate of the transistor T6 is connected to the drain of the transistor T1. The first source/drain (hereinafter "the drain") of the transistor T6 is connected to the source of the transistor T5. The second source/drain (hereinafter "the source") of the transistor T6 is connected to the second ground voltage VSS2. Wherein, the drain signal of the transistor T5 is the second signal 631.

Figure 6B:
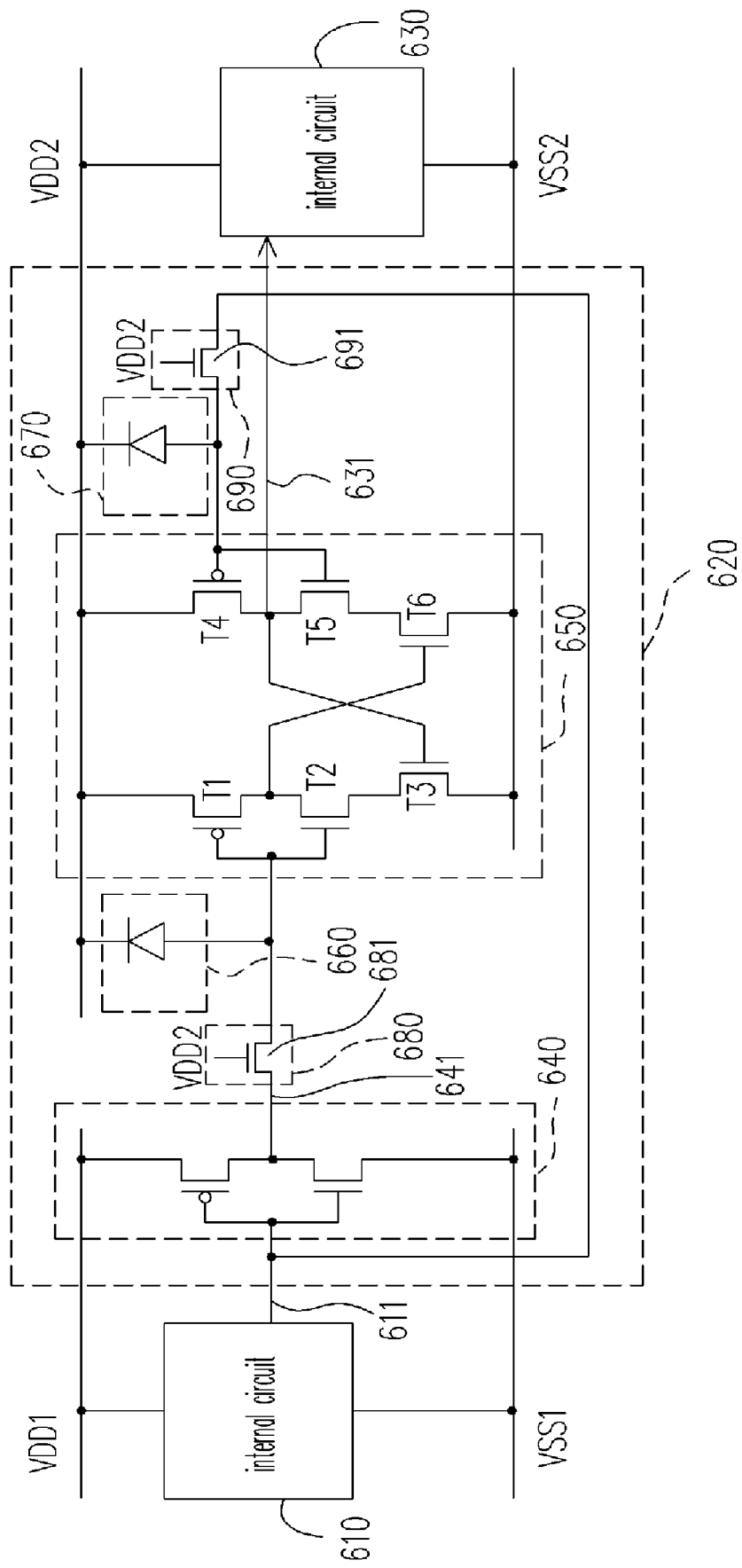
FIG. 6B schematically illustrates a circuit diagram of another level shifter ESD protection circuit according to another embodiment of the present invention.

The first connecting end of the first ESD clamp circuit 660 is connected to the second system voltage VDD2, the second connecting end of the first ESD clamp circuit 660 is connected to the gates of the transistors T1 and T2 simultaneously. In the present embodiment, the ESD clamp circuit 660, for example, includes a P transistor. Wherein, the drain of the P transistor is connected to the first input end (the gates of the transistors T1 and T2) of the voltage level shifting circuit 650. The gate, the source and the bulk of the P transistor are all connected to the second system voltage VDD2. Or, as known by those who are skilled in the art, the ESD clamp circuit 660 can also be implemented using diode or other method, and the result thereof is also within the scope of the present invention. FIG. 6B schematically illustrates a circuit diagram of another level shifter ESD protection circuit according to another embodiment of the present invention. With reference to FIG. 6B, if the ESD clamp circuit 660 is implemented with diode, then the anode of the diode is connected to the first input end of the voltage level shifting circuit 650, while the cathode of the diode is connected to the second system voltage VDD2.

In the present embodiment, the embodiment of the second ESD clamp circuit 670 is the same with that of the first ESD clamp circuit 660, therefore here the description is not repeated.

Figure 7A:
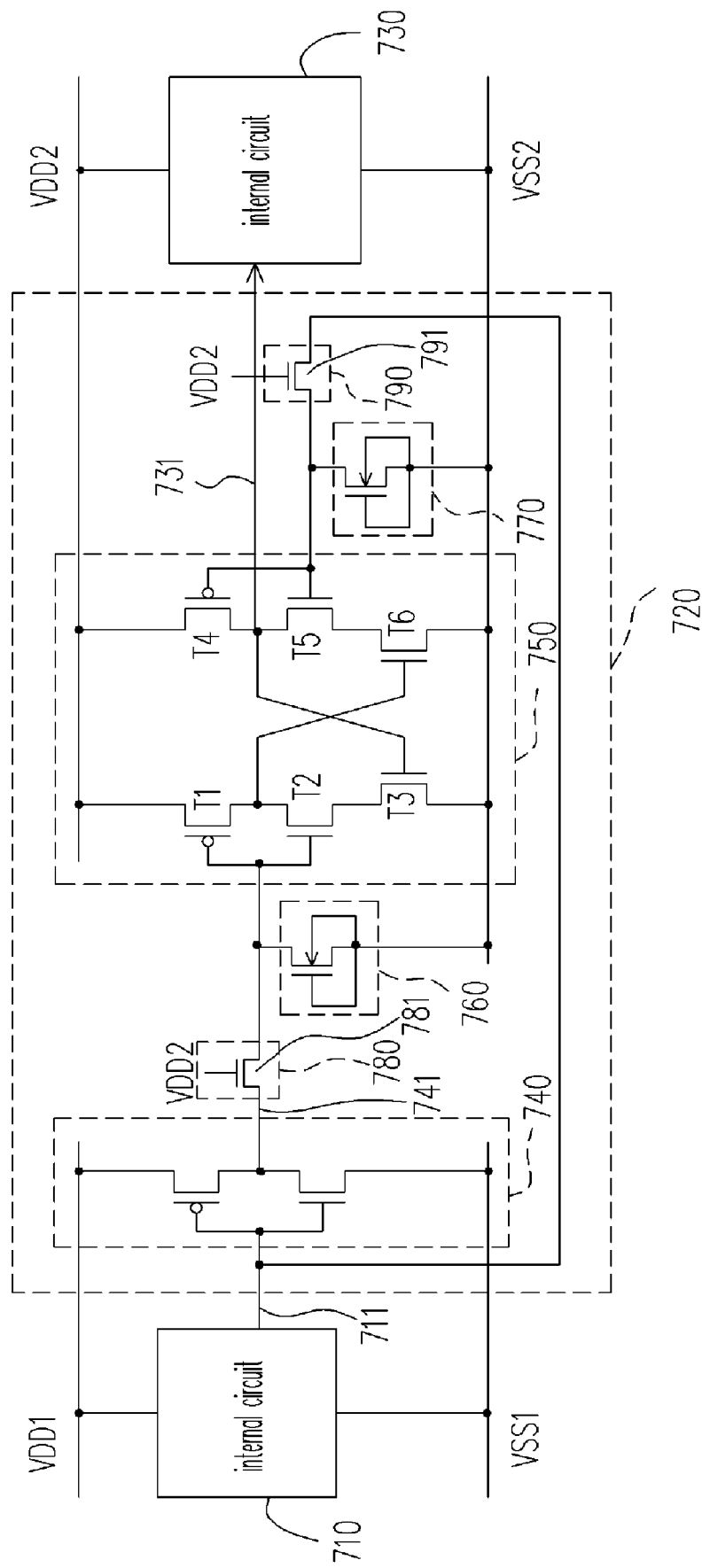
FIG. 7A schematically illustrates a circuit diagram of a level shifter ESD protection circuit according to another embodiment of the present invention.

FIG. 7A schematically illustrates a circuit diagram of a level shifter ESD protection circuit according to another embodiment of the present invention. With reference to FIG. 7A, the level shifter 720 receives the first signal 711 outputting from the internal circuit 710 in IC and outputs the second signal 731 (received by the internal circuit 730 in IC) with the corresponding level according to the level of first signal 711. Wherein, the first signal 711 operates between the first system voltage VDD1 (for example, 12 volts) and the first ground voltage VSS1 (for example, 0 volt). And the second signal 731 operates between the second system voltage VDD2 (for example, 3.3 volts) and the second ground voltage VSS2 (for example, 0 volt).

In the present embodiment, the level shifter 720, for example, includes the inverter 740, the voltage level shifting circuit 750, the ESD clamp circuit 760, the ESD clamp circuit 770, the first switch 780 and the second switch 790. The inverter 740 receives the first signal 711 and outputs the first inverted signal 741. Wherein, the first inverted signal 741 is the inverse of the first signal 711, and the first inverted signal 741 operates between the first system voltage VDD1 and the first ground voltage VSS1. Here, since the inverter 740 and the voltage level shifting circuit 750 are respectively the same as the inverter 640 and the voltage level shifting circuit 650 previously described, therefore it is not described.

The first end of the first switch 780 is connected to the output end of the inverter 740 and receives the first inverted signal 741. The first end of the second switch 790 receives the first signal 711. The first switch 780 and the second switch 790 respectively determine the connection status between the first end and second end according to the level of the second system voltage VDD2. In other words, when the second system voltage VDD2 is powered on, both the first switch 780 and the second switch 790 are switched on; on the contrary, when the second system voltage VDD2 is off, both the first switch 780 and the second switch 790 are switched off.

In the present embodiment, the first switch 780 includes an N transistor 781. The gate of the transistor 781 is connected to the second system voltage VDD2, and its first connecting end and its second connecting end respectively are the first end and the second end of the first switch 780. The second switch 790 includes an N transistor 791. The gate of the transistor 791 is connected to the second system voltage VDD2, and its first connecting end and its second connecting end respectively are the first end and the second end of the second switch 790.

Figure 7B:
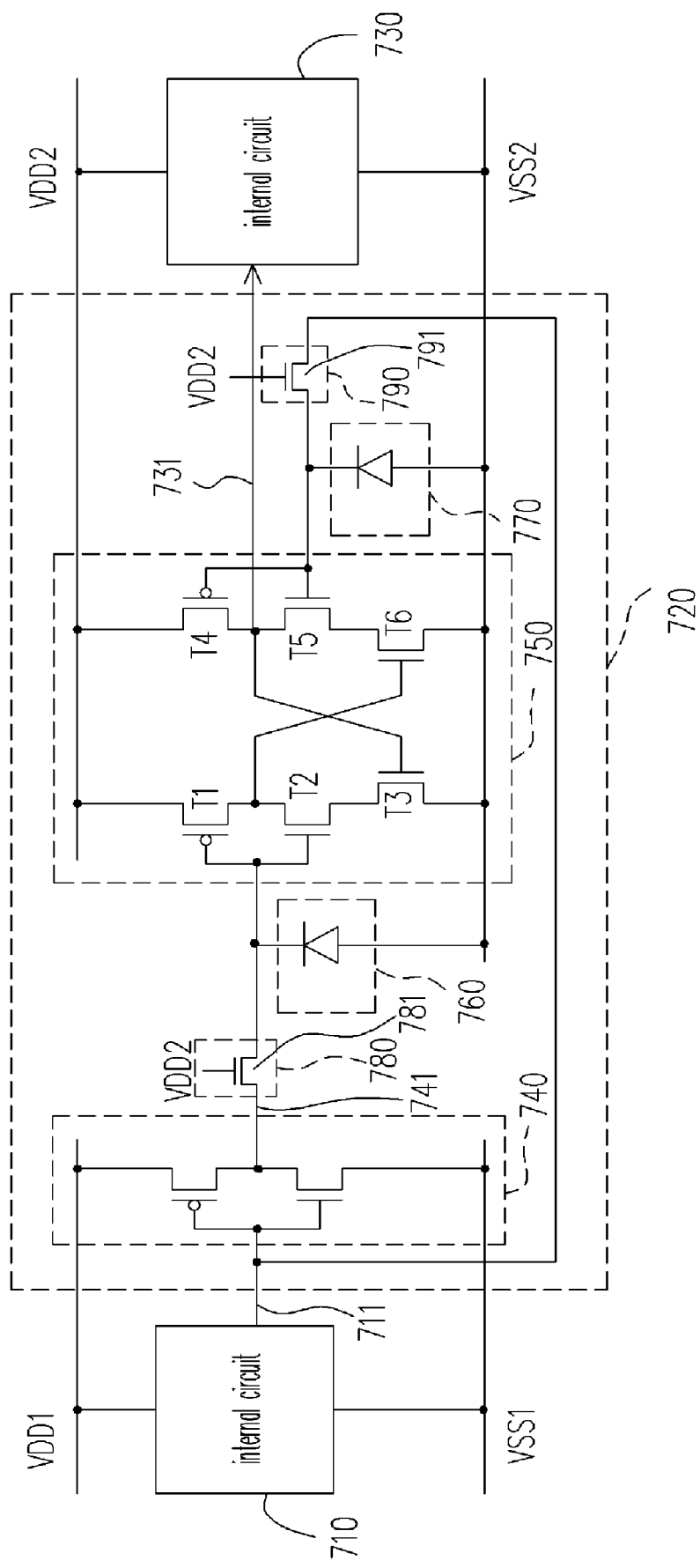
FIG. 7B schematically illustrates a circuit diagram of another level shifter ESD protection circuit according to another embodiment of the present invention.

The first connecting end of the ESD clamp circuit 760 is connected to the gates of the transistors T1 and T2 simultaneously, and the second connecting end of the ESD clamp circuit 760 is connected to the second ground voltage VSS2. In the present embodiment, the ESD clamp circuit 760, for example, includes an N transistor. Wherein, the drain of the N transistor is connected to the first input end of the voltage level shifting circuit 750; and the gate, the source and the bulk of the N transistor are all connected to the second ground voltage VSS2. Or, as known by those who are skilled in the art, the ESD clamp circuit 760 can also be implemented using diode or other method, and the result thereof is also within the scope of the present invention. FIG. 7B schematically illustrates a circuit diagram of another level shifter ESD protection circuit according to another embodiment of the present invention. With reference to FIG. 7B, if the first ESD clamp circuit 760 is implemented with diode, the cathode of the diode is connected to the first input end of the voltage level shifting circuit 750, while the anode of the diode is connected to the second ground voltage VSS2.

In the present embodiment, since the implementation of the second ESD clamp circuit 770 is similar to that of the first ESD clamp circuit 760, therefore it is not described again.

Particularly note that, in the present embodiment, the voltage level shifting circuit 450 in FIG. 4A and FIG. 4B can be substituted by any voltage level shifting circuits; for example the voltage level shifting circuit 250 in FIG. 2A, the voltage level shifting circuit 550 in FIG. 5A, the voltage level shifting circuit 650 in FIG. 6A and other voltage level shifting circuits, etc. The results thereof are also within the scope of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A level shifter ESD protection circuit, being used to receive a first signal and to output a second signal with the corresponding level according to the level of the first signal, wherein the first signal operates between a first system voltage and a first ground voltage, and the second signal operates between a second system voltage and a second ground voltage, the level shifter ESD protection circuit comprises:

an inverter receiving the first signal and outputting a first inverted signal, wherein the first inverted signal is the inverse of the first signal, and the first inverted signal operates between the first system voltage and the first ground voltage;

a first switch, the first end of the first switch being connected to the output end of the inverter to receive the first inverted signal, so as to determine the connection status between its first end and the second end according to the level of the second system voltage;

a second switch, the first end of the second switch receiving the first signal to determine the connection status between the first end and the second end of the switch according to the level of the second system voltage;

a voltage level shifting circuit, its first input end being connected to the second end of the first switch, the second input end of the voltage level shifting circuit being connected to the second end of the second switch, the output end of the voltage level shifting circuit outputting the second signal;
a first ESD clamp circuit, its first connecting end being connected to the second system voltage, its second connecting end being connected to the first input end of the voltage level shifting circuit; and
a second ESD clamp circuit, its first connecting end being connected to the second system voltage, its second connecting end being connected to the second input end of the voltage level shifting circuit.

2. The level shifter ESD protection circuit of claim 1, wherein the first switch comprises an N transistor, and the gate of the N transistor is connected to the second system voltage, the first connecting end and the second connecting end of the N transistor respectively are the first end and the second end of the first switch.

3. The level shifter ESD protection circuit of claim 1, wherein the first ESD clamp circuit comprises a P transistor, wherein the drain of the P transistor is connected to the first input end of the voltage level shifting circuit, and the gate, the source and the bulk of the P transistor are connected to the second system voltage.

4. The level shifter ESD protection circuit of claim 1, wherein the first ESD clamp circuit comprises a diode, wherein the anode of the diode is connected to the first input end of the voltage level shifting circuit, and the cathode of the diode is connected to the second system voltage.

5. The level shifter ESD protection circuit of claim 1, wherein the inverter comprises:
a P transistor, its source being connected to the first system voltage, its gate receiving the first signal, its drain outputting the first inverted signal; and
an N transistor, its gate receiving the first signal, its drain being connected to the drain of the P transistor, the source of the N transistor being connected to the first ground voltage.

6. The level shifter ESD protection circuit of claim 1, wherein the voltage level shifting circuit comprises:
a first transistor, its first source/drain being connected to the second system voltage;
a second transistor, its gate being the first input end of the voltage level shifting circuit, its first source/drain being connected to the second source/drain of the first transistor;
a third transistor, its gate being connected to the gate of the second transistor, the first source/drain of the third transistor being connected to the second source/drain of the second transistor, the second source/drain of the third transistor being connected to the second ground voltage;
a fourth transistor, its first source/drain being connected to the second system voltage, its gate being connected to the second source/drain of the second transistor;
a fifth transistor, its gate being the second input end of the voltage level shifting circuit, its first source/drain being connected to the second source/drain of the fourth transistor, the second source/drain of the fifth transistor being connected to the gate of the first transistor; and
a sixth transistor, its gate being connected to the gate of the fifth transistor, the first source/drain of the sixth transistor being connected to the second source/drain of the fifth transistor, the second source/drain of the sixth transistor being connected to the second ground voltage, wherein the signal of the first source/drain of the sixth transistor is the second signal.

7. The level shifter ESD protection circuit of claim 6, wherein the first, the second, the fourth and the fifth transistor are P transistors, the third and the sixth transistor are N transistors.

8. The level shifter ESD protection circuit of claim 1, wherein the voltage level shifting circuit comprises:
a first transistor, its first source/drain being connected to the second system voltage, its gate being the first input end of the voltage level shifting circuit;
a second transistor, its first source/drain being connected to the second source/drain of the first transistor, the second source/drain of the second transistor being connected to the second ground voltage;
a third transistor, its first source/drain being connected to the second system voltage, its second source/drain being connected to the gate of the second transistor, the gate of the third transistor being the second input end of the voltage level shifting circuit; and
a fourth transistor, its gate being connected to the second source/drain of the first transistor, the first source/drain of the fourth transistor being connected to the second source/drain of the third transistor, the second source/drain of the fourth transistor being connected to the second ground voltage, wherein the signal of the first source/drain of the fourth transistor is the second signal.

9. The level shifter ESD protection circuit of claim 8, wherein the first and the third transistor are P transistors, the second and the fourth transistor are N transistors.

10. The level shifter ESD protection circuit of claim 1, wherein the voltage level shifting circuit comprises:
a first transistor, its gate being the first input end of the voltage level shifting circuit, its first source/drain being connected to the second system voltage;
a second transistor, its gate being connected to the gate of the first transistor, the first source/drain of the second transistor being connected to the second source/drain of the first transistor;
a third transistor, its first source/drain being connected to the second source/drain of the second transistor, the second source/drain of the third transistor being connected to the second ground voltage;
a fourth transistor, its first source/drain being connected to the second system voltage, its second source/drain being connected to the gate of the third transistor, the gate of the fourth transistor being the second input end of the voltage level shifting circuit;
a fifth transistor, its gate being connected to the gate of the fourth transistor, the first source/drain of the fifth transistor being connected to the second source/drain of the fourth transistor; and
a sixth transistor, its gate being connected to the second source/drain of the first transistor, the first source/drain of the sixth transistor being connected to the second source/drain of the fifth transistor, the second source/drain of the sixth transistor being connected to the second ground voltage, wherein the signal of the first source/drain of the fifth transistor is the second signal.

11. The level shifter ESD protection circuit of claim 10, wherein the first and the fourth transistor are P transistors, the second, the third, the fifth and the sixth transistor are N transistors.

12. A level shifter ESD protection circuit, being used to receive a first signal and to output a second signal with the corresponding level according to the level of the first signal, wherein the first signal operates between a first system voltage and a first ground voltage, and the second signal operates between a second system voltage and a second ground voltage, the level shifter ESD protection circuit comprises:
- an inverter, its first end receiving the first signal and outputting a first inverted signal, wherein the first inverted signal is the inverse of the first signal, and the first inverted signal operates between the first system voltage and the first ground voltage;
- a first switch, the first end of the first switch being connected to the output end of the inverter to receive the first inverted signal, to determine the connection status between its first end and the second end according to the level of the second system voltage;
- a second switch, the first end of the second switch receiving the first signal, to determine the connection status between the first end and the second end of the switch according to the level of the second system voltage;
- a voltage level shifting circuit, its first input end being connected to the second end of the first switch, the second input end of the voltage level shifting circuit being connected to the second end of the second switch, the output end of the voltage level shifting circuit outputting the second signal;
- a first ESD clamp circuit, its first connecting end being connected to the first input end of the voltage level shifting circuit, its second connecting end being connected to the second ground voltage; and
- a second ESD clamp circuit, its first connecting end being connected to the second input end of the voltage level shifting circuit, its second connecting end being connected to the second ground voltage.

13. The level shifter ESD protection circuit of claim 12, wherein the first switch comprises an N transistor, and the gate of the N transistor is connected to the second system voltage, the first connecting end and the second connecting end of the N transistor respectively are the first end and the second end of the first switch.

14. The level shifter ESD protection circuit of claim 12, wherein the first ESD clamp circuit comprises an N transistor, the drain of the N transistor is connected to the first input end of the voltage level shifting circuit, and the gate, the source and the bulk of the N transistor are all connected to the second ground voltage.

15. The level shifter ESD protection circuit of claim 12, wherein the first ESD clamp circuit comprises a diode, the cathode of the diode is connected to the first input end of the voltage level shifting circuit, and the anode of the diode is connected to the second ground voltage.

16. The level shifter ESD protection circuit of claim 12, wherein the inverter comprises:
- a P transistor, its source being connected to the first system voltage, its gate receiving the first signal, its drain outputting the first inverted signal; and
- an N transistor, its gate receiving the first signal, its drain being connected to the drain of the P transistor, the source of the N transistor being connected to the first ground voltage.

17. The level shifter ESD protection circuit of claim 12, wherein the voltage level shifting circuit comprises:
- a first transistor, its first source/drain being connected to the second system voltage;
- a second transistor, its gate being the first input end of the voltage level shifting circuit, its first source/drain being connected to the second source/drain of the first transistor, the second source/drain of the second transistor being connected to the second ground voltage;
- a third transistor, its first source/drain being connected to the second system voltage, its second source/drain of the third transistor being connected to the gate of the first transistor, the gate of the third transistor being connected to the second source/drain of the first transistor; and
- a fourth transistor, its gate being the second input end of the voltage level shifting circuit, it first source/drain being connected to the second source/drain of the third transistor, its second source/drain of the fourth transistor being connected to the second ground voltage, wherein the first source/drain of the fourth transistor is the second signal.

18. The level shifter ESD protection circuit of claim 17, wherein the first and the third transistor are P transistors, the second and the fourth transistor are N transistors.

19. The level shifter ESD protection circuit of claim 12, wherein the voltage level shifting circuit comprises:
- a first transistor, its gate being the first input end of the voltage level shifting circuit, its first source/drain being connected to the second system voltage;
- a second transistor, its gate being connected to the gate of the first transistor, the first source/drain of the second transistor being connected to the second source/drain of the first transistor;
- a third transistor, its first source/drain being connected to the second source/drain of the second transistor, the second source/drain of the third transistor being connected to the second ground voltage;
- a fourth transistor, its first source/drain being connected to the second system voltage, its second source/drain being connected to the gate of the third transistor, the gate of the fourth transistor being the second input end of the voltage level shifting circuit;
- a fifth transistor, its gate being connected to the gate of the fourth transistor, the first source/drain of the fifth transistor being connected to the second source/drain of the fourth transistor; and
- a sixth transistor, its gate being connected to the second source/drain of the first transistor, the first source/drain of the sixth transistor being connected to the second source/drain of the fifth transistor, the second source/drain of the sixth transistor being connected to the second ground voltage, wherein the signal of the first source/drain of the fifth transistor is the second signal.

20. The level shifter ESD protection circuit of claim 19, wherein the first and the fourth transistor are P transistors, the second, the third, the fifth and the sixth transistor are N transistors.

21. A level shifter ESD protection circuit, being used to receive a first signal and to output a second signal with the corresponding level according to the level of the first signal, wherein the first signal operates between a first system voltage and a first grounding voltage, and the second signal operates between a second system voltage and a second ground voltage, the level shifter ESD protection circuit comprises:
- an inverter receiving the first signal and outputting a first inverted signal, wherein the first inverted signal is the inverse of the first signal, and the first inverted signal operates between the first system voltage and the first ground voltage;
- a first switch, the first end of the first switch being connected to the output end of the inverter to receive the first inverted signal, to determine the connection status between its first end and the second end according to the level of the second system voltage;

a second switch, the first end of the second switch receiving the first signal, to determine the connection status between the first end and the second end of the second switch according to the level of the second system voltage;

a voltage level shifting circuit, its first input end being connected to the second end of the first switch, the second input end of the voltage level shifting circuit being connected to the second end of the second switch, the output end of the voltage level shifting circuit outputting the second signal; and an ESD clamp circuit, its first connecting end being connected to the second system voltage, and its second connecting end being connected to the first ground voltage.

22. The level shifter ESD protection circuit of claim 21, wherein the first switch comprises an N transistor, and the gate of the N transistor is connected to the second system voltage, the first connecting end and the second connecting end of the N transistor respectively are the first end and the second end of the first switch.

23. The level shifter ESD protection circuit of claim 21, wherein the ESD clamp circuit comprises a transistor, wherein the collector of the transistor is connected to the second system voltage, the base and the emitter of the transistor are connected to the first ground voltage.

24. The level shifter ESD protection circuit of claim 21, wherein the ESD clamp circuit comprises a diode, wherein the anode of the diode is connected to the first ground voltage, and the cathode of the diode is connected to the second system voltage.

25. The level shifter ESD protection circuit of claim 21, wherein the inverter comprises:

a P transistor, its source being connected to the first system voltage, its gate receiving the first signal, its drain outputting the first inverted signal; and an N transistor, its gate receiving the first signal, its drain being connected to the drain of the P transistor, the source of the N transistor being connected to the first ground voltage.

26. The level shifter ESD protection circuit of claim 21, wherein the voltage level shifting circuit comprises:

a first transistor, its first source/drain being connected to the second system voltage;

a second transistor, its gate being the first input end of the voltage level shifting circuit, its first source/drain being connected to the second source/drain of the first transistor;

a third transistor, its gate being connected to the gate of the second transistor, the first source/drain of the third transistor being connected to the second source/drain of the second transistor, the second source/drain of the third transistor being connected to the second ground voltage;

a fourth transistor, its first source/drain being connected to the second system voltage, its gate being connected to the second source/drain of the second transistor;

a fifth transistor, its gate being the second input end of the voltage level shifting circuit, its first source/drain being connected to the second source/drain of the fourth transistor, the second source/drain of the fifth transistor being connected to the gate of the first transistor; and a sixth transistor, its gate being connected to the gate of the fifth transistor, the first source/drain of the sixth transistor being connected to the second source/drain of the fifth transistor, the second source/drain of the sixth transistor being connected to the second ground voltage, wherein the signal of the first source/drain of the sixth transistor is the second signal.

27. The level shifter ESD protection circuit of claim 26, wherein the first, the second, the fourth and the fifth transistor are P transistors, the third and the sixth transistor are N transistors.

* * * * *